(12) United States Patent
Yamada et al.

(10) Patent No.: US 6,407,745 B1
(45) Date of Patent: Jun. 18, 2002

(54) DEVICE, METHOD AND STORAGE MEDIUM FOR PROCESSING IMAGE DATA AND CREATING EMBROIDERY DATA

(75) Inventors: Kenji Yamada; Ryohei Komiya, both of Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/413,252

(22) Filed: Oct. 7, 1999

(30) Foreign Application Priority Data

Oct. 8, 1998 (JP) .......................... 10-286763

(51) Int. Cl.$^7$ .............................. G06T 11/60
(52) U.S. Cl. ...................................... 345/593
(58) Field of Search ............... 112/78, 236, 439, 112/475.18; 38/102.2; 345/435, 155, 419, 420, 429, 431, 433, 581, 589, 591, 593, 620, 626, 664, 665, 694; D2/764, 766, 772

(56) References Cited

U.S. PATENT DOCUMENTS

| | | | |
|---|---|---|---|
| 5,181,176 A | | 1/1993 | Hayakawa |
| 5,540,609 A | * | 7/1996 | Hoag .......................... 446/26 |
| 5,687,306 A | * | 11/1997 | Blank .......................... 395/135 |
| 5,880,963 A | * | 3/1999 | Futamura ............... 364/470.09 |
| 6,008,820 A | * | 12/1999 | Chauvin et al. ............. 345/502 |

FOREIGN PATENT DOCUMENTS

JP 7-88264 4/1995

* cited by examiner

Primary Examiner—Matthew Luu
Assistant Examiner—G. F. Cunningham
(74) Attorney, Agent, or Firm—Oliff & Berridge, PLC

(57) ABSTRACT

The invention provides an image processing device and method to simplify the operations in processing image data of an original color picture. In the case of creating embroidery data using the embroidery data generation device, or the programs stored in the storage medium according to the invention, the image data of an original color picture is first retrieved by an image scanner. Then, the number of colors in the image data is reduced, thereby converting the original picture into image planes. If necessary, a plurality of image planes are combined into one. The image planes are edited and revised, and later, formed into a composite image to be displayed. Finally, the image data of each image plane is processed for creating embroidery data. According to the invention, when an image plane is edited, the other image planes are automatically revised in correspondence with the preceding edit. Therefore, the operations in processing image data and creating embroidery data are simplified, and which leads to a savings of time and labor.

23 Claims, 28 Drawing Sheets

Fig.11

THREAD-COLOR LOOK-UP TABLE

THREAD

| COLOR CODE | (R, G, B) |
|---|---|
| 001 | (000, 000, 000) |
| 002 | (255, 000, 000) |
| 003 | (000, 255, 000) |
| 004 | (000, 000, 255) |
| 005 | (255, 255, 000) |

BLACK ←
RED ←
GREEN ←
BLUE ←
YELLOW ←

D1

D2

H1

H2

DEVICE, METHOD AND STORAGE MEDIUM FOR PROCESSING IMAGE DATA AND CREATING EMBROIDERY DATA

BACKGROUND OF THE INVENTION

1. Field of Invention

The invention relates to an image processing device and method that are preferably utilized for creating embroidery data based on an original color picture (such as a color photograph). The invention further relates to an embroidery data generation device and a storage medium for storing an image processing programs.

2. Description of Related Art

Using an embroidery machine (embroidery sewing machine), various designs and patterns are embroidered using its automatic embroidery workings based on embroidery data, which regulates, for example, the movement of a machine needle in the X or Y axis direction of an embroidery hoop (a workpiece) on each stitch.

There has been developed an embroidery data generation device utilized for creating the embroidery data of a desired pattern that includes, for instance, a personal computer with an image scanner, a CRT display and a keyboard being connected thereto. In this configuration, an original picture is first scanned by the image scanner, and referred to as image data. The image data is processed to form a plurality of outline data that outline the border of the image data, and to create the embroidery data. If the image data is multicolored, the embroidery data for each color is originated from each color of the image data.

The embroidery data is created by the above-described procedure so that the embroidery resembles the original picture, when the original picture has a relatively clear outline like a simple illustration.

On the other hand, if the original picture has the subtle gradation of various colors like a color photograph and does not have a clear outline, it is difficult to extract each embroidery area automatically. The subtle color differences and boundaries may be difficult to distinguish with the naked eye when editing the original picture.

Furthermore, it is a laborious procedure to manually trace the supposed outline of the color image data for creating the embroidery data. For instance, repeated operations are required to achieve the resulted outline with the operator's intention which are to select, cut and paste. When the selected outline does not match with the operator's intention, the operator may try another operation. Specifically, the operator may undo the previous operations and again select, cut and paste. Thus, it is time-consuming work to endeavor to get the satisfied result.

SUMMARY OF THE INVENTION

The invention concerns solving the problem described above. More specifically, one aspect of the invention concerns simplifying the operations in processing color images and creating embroidery data based on an original color picture, whereby time and labor could be saved.

Thus, the invention provides an image processing device and method that is utilized for creating embroidery data based on an original color picture. This image processing device may include: an image data input unit that inputs original image data; an image converting unit that converts the original image data into a plurality of image planes based on a feature; and an image editor that edits the converted image planes. The image processing device may also include an image revising unit that automatically revises the other image planes based on the preceding edit.

With this arrangement, the image converting unit may reduce the number of colors in the image data, which is input based on an original color picture by the image input device, to a reduced number. Then, the image data is converted into a plurality of image planes by the image converting unit. Thus, even when color differences or boundaries are difficult to distinguish, the claimed invention makes easier to edit or revise the monochrome images by ensuring each shape. One of the image planes is edited by the image editor, whereupon the others are automatically revised by the image revising unit based on the preceding edit.

According to the invention, the image editor and the image revising unit are associated with one another. The revising process is automatically performed after the editing process by specifying the images that will be edited and revised, without the necessity to specifically instruct the revising process. Therefore, it is possible for users to convert the image data into comparatively a few image planes and to edit these image planes as embroidery areas easily and favorably, even if the original picture is composed of small areas and is multicolored.

Specifically, the image editor includes a deletion function for deleting pixel information within a designated area of the image plane. In this case, the image revising unit automatically restore the pixel information in correspondence on the designated area of the image plane corresponding to the preceding deletion so as to compensate for the preceding deletion and balance the total image. Further, the editor also includes an adding function that supplements pixel information into a designated area of the image plane. In this case, the revising unit automatically deducts the pixel information corresponding to the preceding addition from all the other image planes. Consequently, an operator can easily edit the image planes by automatically deleting or supplementing the image data, even if the images are complicated.

In addition, the image processing device preferably comprises an image displaying unit. The image planes are formed into a composite image by the image displaying unit, and then displayed. Thus, an operator, can easily confirm that each of the image planes is put into a desired shape so as to match with one's total image by looking at the composite image.

Furthermore, the image processing device may comprise an image combining unit that forms a single image plane from the plurality of image planes. Thus, an operator can easily reduce the number of the image planes as one desires.

According to the invention, there is also provided an embroidery data generation device. This embroidery data generation device may include the above-described image processing device therein; an embroidery data generator for creating embroidery data on each embroidery area based on the image planes created by the image processing device; and thread-color determination unit for determining thread-colors in correspondence with the color of the image planes, and accompanying the thread-color data with the embroidery data.

With this arrangement, it is possible to convert the original picture into image planes and to create the embroidery data at operator's desire without intricate operations. Also, it is not necessary to designate the thread-colors specially, since the thread-color data automatically accompanies the embroidery data using the thread-color determination unit.

It is an additional aspect of the invention to provide a storage medium for storing image processing programs, which may include a program for inputting original image data; a program for converting the original image data into a plurality of image planes based on a feature; and a program for editing the converted image planes.

The storage medium for storing embroidery data generation programs, may also include the above-described image processing program; a program for creating embroidery data on each embroidery area based on the image planes created by the image processing program; and a thread-color determination program for determining thread-colors in correspondence with the color of the image planes, and accompanying the thread-color data with the embroidery data.

With the image processing program and the embroidery data generation program stored in the aforementioned memories, it becomes easy to process a color image and to create embroidery data using an ordinary personal computer system, even if the image processing device and the embroidery data generation device are not exclusively provided. Thus, the invention will be applied more widely.

BRIEF DESCRIPTION OF THE DRAWINGS

The invention will be understood more clearly with reference to the following figures wherein:

FIG. 11 schematically shows the structure of thread-color look-up table according to a preferred embodiment of the invention;

DETAILED DESCRIPTION OF PREFERRED EMBODIMENTS

Figure 12:
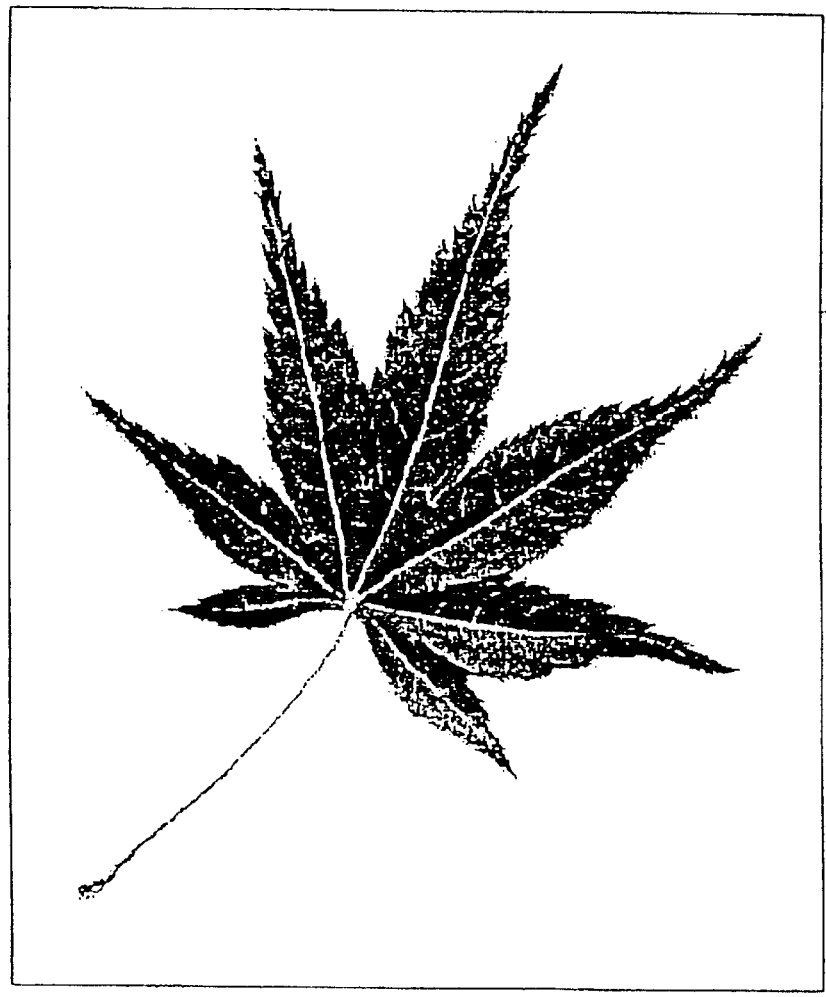
FIG. 12 is an original picture A by way of example given to explain a preferred embodiment of the invention.

A preferred embodiment will be described with reference to FIGS. 1 to 28, in which the invention is applied to an embroidery data generation device for a home-use embroidery sewing machine. This embroidery data generation device also comprises a function of an image processing device. Herein, a typical example will be given to explain a preferred embodiment of the invention in detail, wherein the embroidery data is created based on an original picture A (color photograph) of a maple leaf shown in FIG. 12.

First, a home-use embroidery sewing machine will be briefly explained without figures.

The embroidery machine (embroidery sewing machine) forms embroideries of various patterns on a workpiece, which are held by an embroidery hoop on a machine bed. More specifically, the embroidery is formed by the sewing workings of a machine needle and a rotary hook of the sewing machine, while horizontally moving the embroidery hoop to a fixed position defined by XY coordinates on each stitch. In this case, the machine needle and the horizontal movement of the embroidery hoop are controlled by a control unit. The control unit consists of a microcomputer arranged within the sewing machine, and executes the embroidery workings by being given the movement of the machine needle in the X or Y axis direction (refer to as embroidery data or stitch data that instructs respective stitch points).

In the present embodiment, the embroidery sewing machine comprises a memory card device so that the embroidery data can be supplied externally through a memory card 11 (described below). The embroidery sewing machine further comprises a display unit for displaying messages of various operations.

Figure 9:
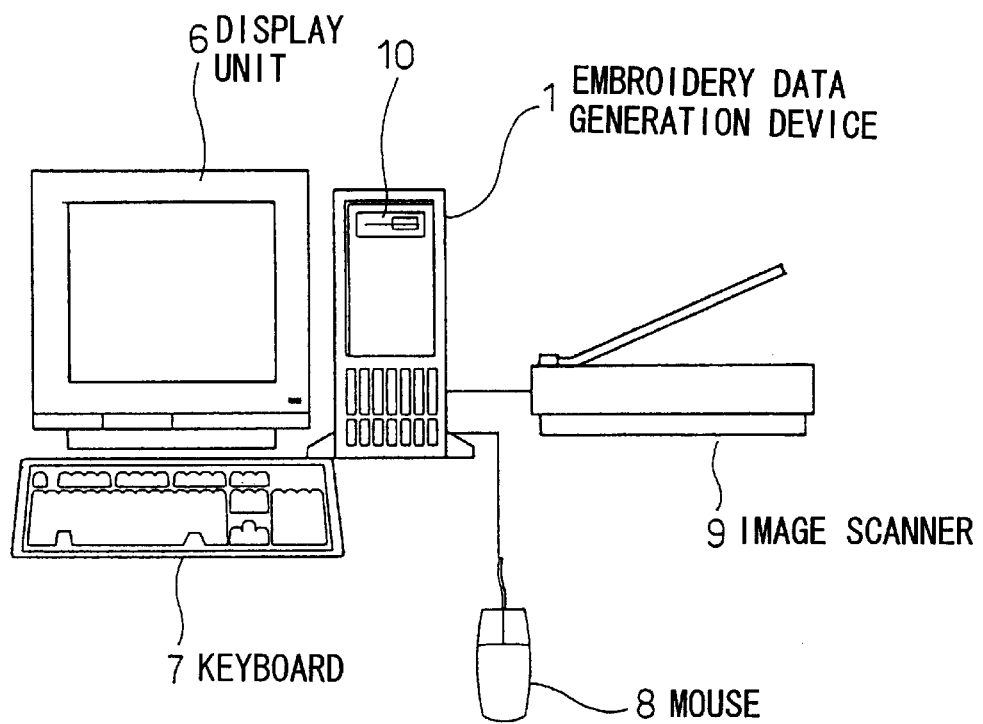
FIG. 9 is a general perspective view of an embroidery data generation device according to a preferred embodiment of the invention.

Next, the structure of the embroidery data generation device 1 will be described. FIG. 9 is a general perspective view, and FIG. 10 schematically shows an electrical composition of the embroidery data generation device 1.

Figure 10:
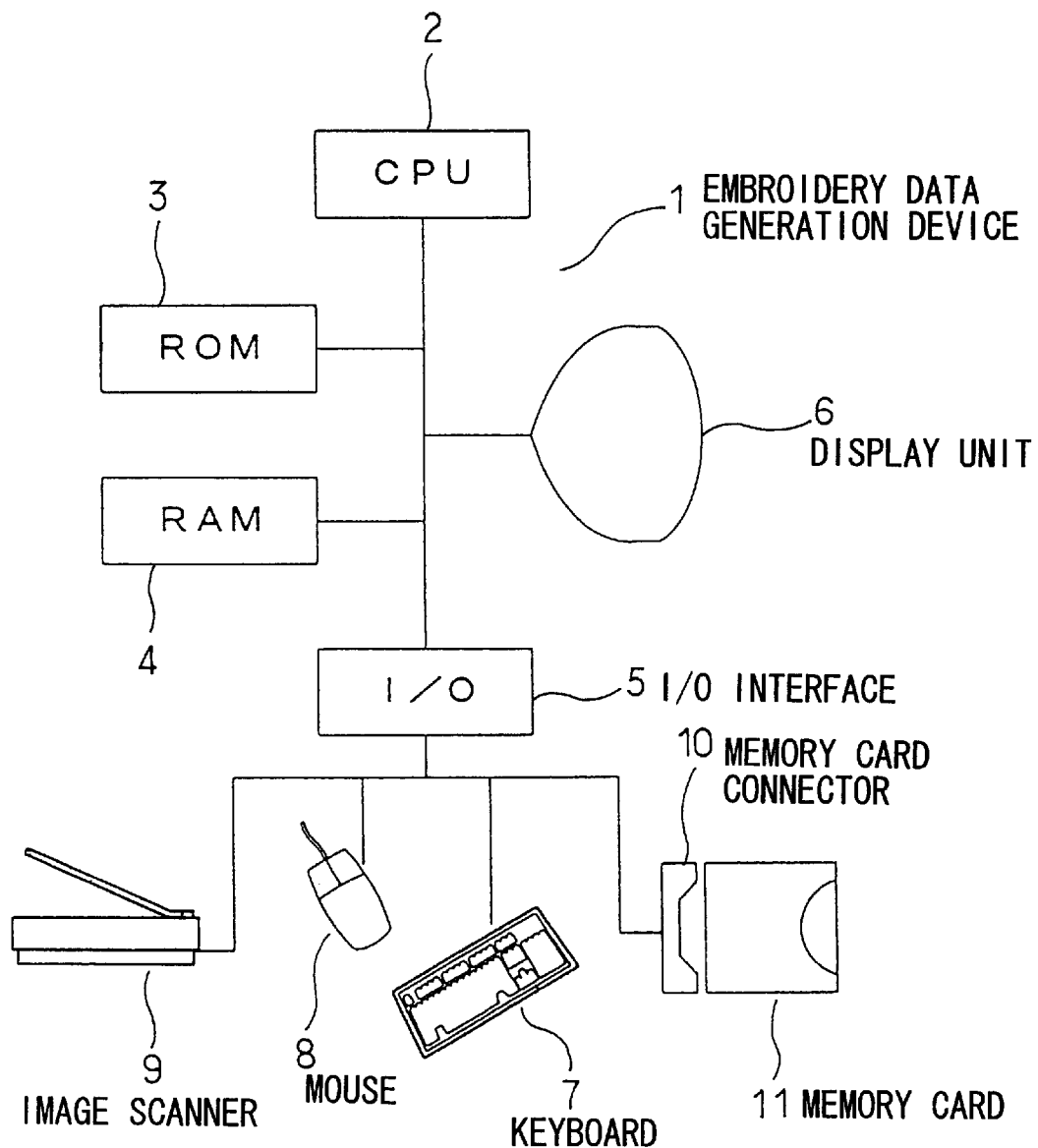
FIG. 10 schematically shows an electrical composition of the embroidery data generation device of FIG. 9.

The embroidery data generation device 1 mainly consists of a microcomputer at comprises a CPU 2, a ROM 3, a RAM 4 and an I/O interface 5, as shown in FIG. 10. As shown in FIGS. 9 and 10, a display unit 6 (for example, a CRT display), a keyboard 7 and a mouse 8 for inputting data and instructing operations, an image scanner 9 and a memory card connector 10, are connected to the device 1 via the I/O interface 5. The display unit 6 serves to display various images, such as an original picture, a monochrome image and a composite image. The keyboard 7 and the mouse 8 serve as instruction devices. Further, the memory card connector 10 is provided so that a memory card 11 (refer to FIG. 10) is attached to and removed from the connector 10. The embroidery data is input and stored in the memory card 11 through the memory card connector 10. The image scanner 9 scans an original picture to get the image data as bit-mapped data. The image data comprises a plurality of pixel data, whereby each of the pixel data has three color components R, G and B which have 8 bits values, respectively.

In the present embodiment, an embroidery data generation program that includes an image processing program utilized for creating the embroidery data based on the image data of the original picture A is stored in advance in the ROM 3. The thread-color look-up table is also stored in the ROM 3. As shown in FIG. 11, the thread-color look-up table represents the relationship between RGB values and the color code of a thread-color. For example, the thread-color can be selected among 64 colors in the present embodiment.

There are also provided in the RAM 4 an original image data area for storing the image data of an original picture; an image plane data area for storing N image planes; a composite image data area for storing a composite image, which is composed of all the image planes; an embroidery data area for storing the embroidery data; a thread-color data area for storing color codes (thread-color data) of embroidery data; and a working area, although this configuration is not shown in the figures.

When executing the embroidery data generation program by the device 1, the image data of an original color picture A is retrieved and the embroidery data is created for forming an embroidery of the original picture A. More specifically, the image data of the original picture A is first scanned by the image scanner 9. Next, the number of colors in the image is optionally reduced into N, whereupon the image data is converted into N on each color to create N image planes. Then, the image planes are edited by, for example, adding or deleting pixel information through operation of the keyboard 7 or the mouse 8. In correspondence with the preceding edit, the other image planes are automatically revised.

According to the present embodiment, the deleted pixel information consists of the absolute coordinate of each pixel and pixel value so that the pixel information corresponding to the preceding deletion in the editing process is automatically added to the exact location of the other image plane. Thus, the consistency of the image is remains.

Further, an image plane may be optionally supplemented with pixel information in the editing process. In this case, all the other image planes are revised so as to deduce the pixel information corresponding to the preceding supplement in the revising process. Besides, more than two image planes may be optionally formed into one in the editing process.

After the editing and the revising processes, all of the image planes are formed into a composite image, and this composite image is displayed on the display unit 6. The composite image is referred to as the embroidery source image data. The embroidery source image data is processed to create the embroidery data of which each of the embroidery data corresponds to the single color data of the embroidery source image data. The color of each embroidery data is determined based on each single color data of the embroidery source image data. The determination procedure is processed to select thread-color from the thread-color look-up table which is akin to the color data of the embroidery source image data.

As described above, the embroidery data generation device 1 may function as the image converting unit, the editor, the revising unit, the image combination unit, the composite image generator, the embroidery data generator, and thread-color determination unit according to a preferred embodiment of the invention. In this regard, the embroidery generation device can fragment image data to N images based on a feature, such as color, brightness, or texture features.

Figure 1:
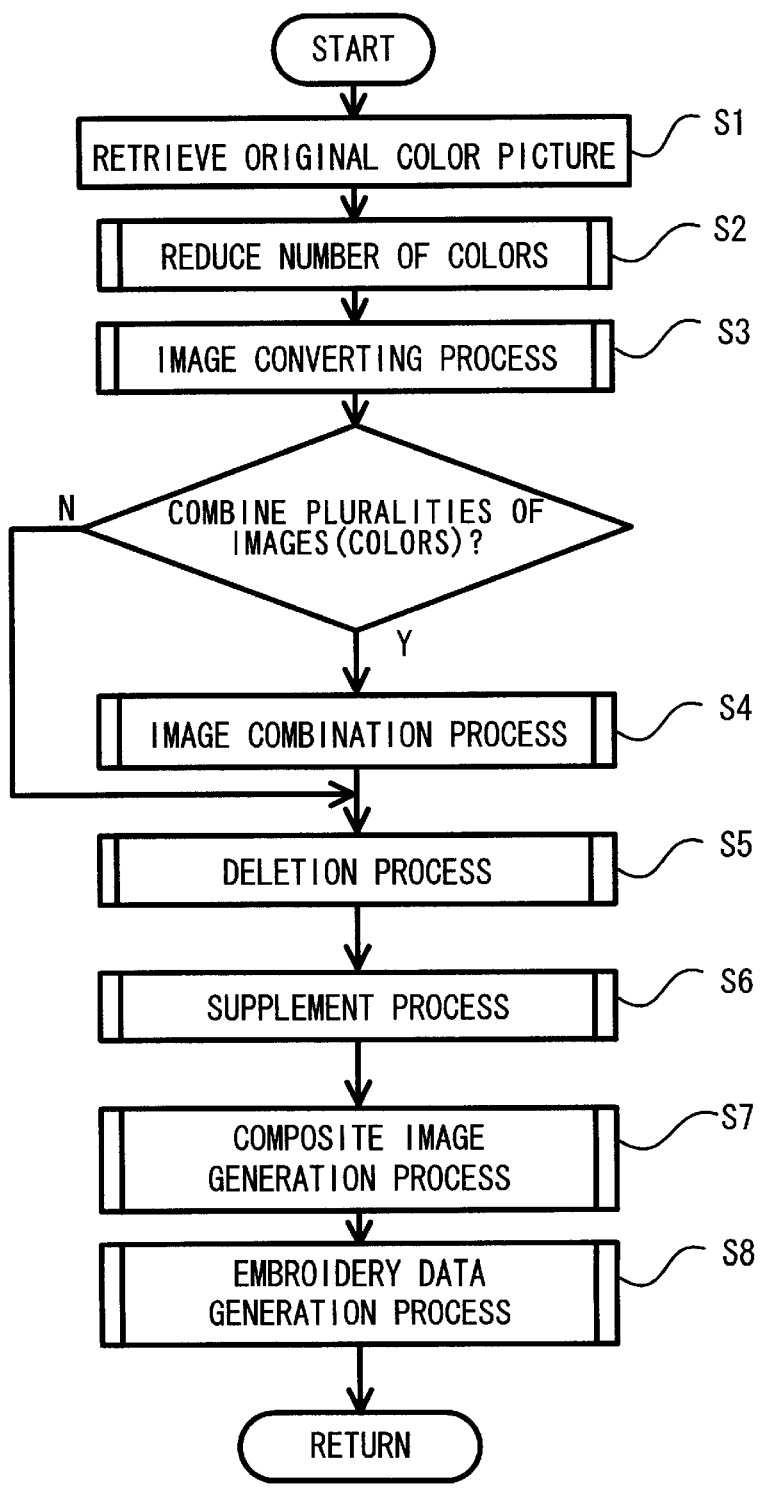
FIG. 1 is a flowchart showing the whole process of creating embroidery data according to a preferred embodiment of the invention.
Figure 2:
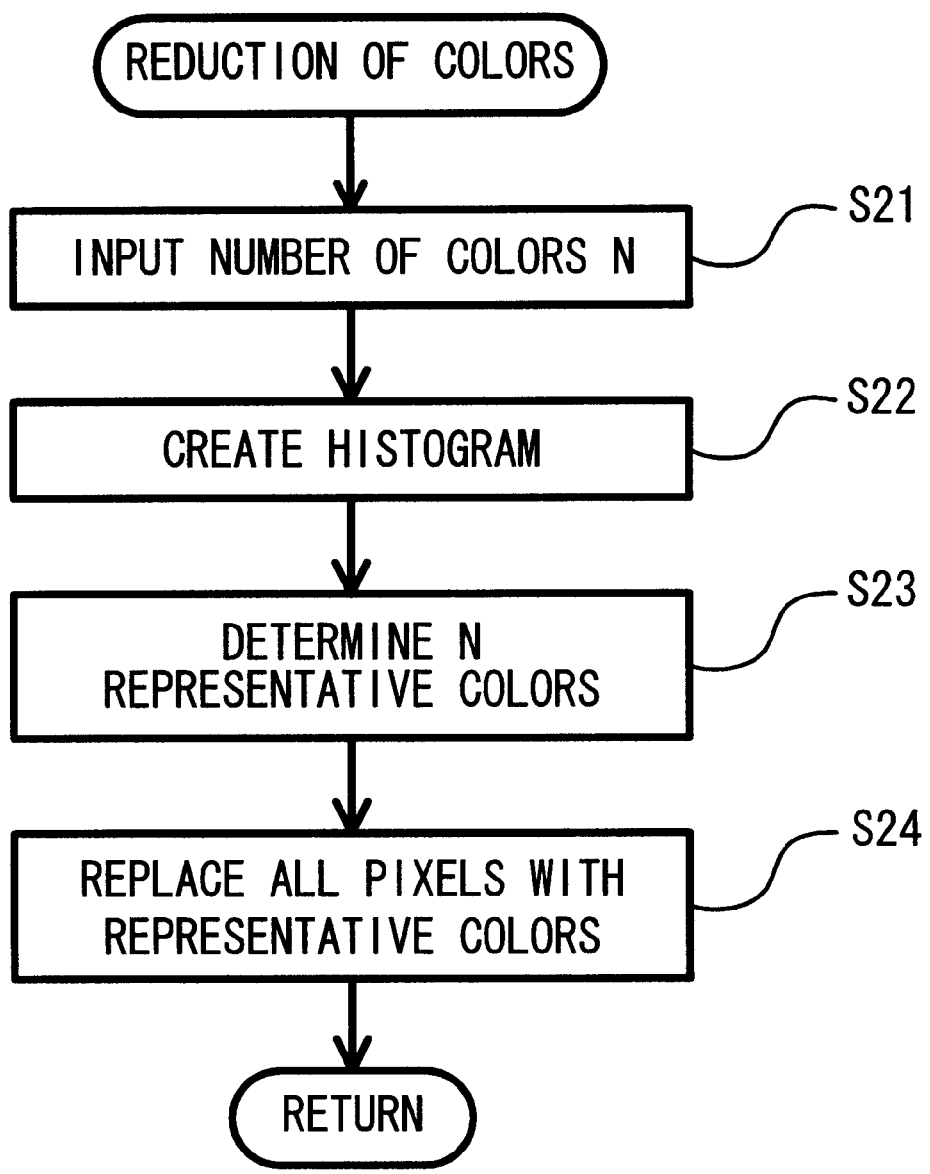
FIG. 2 is a flowchart showing the routines in step S2 of FIG. 1.

The detailed procedure of processing images and creating embroidery data and the workings of the embroidery data generation device 1 will be explained below with reference to FIGS. 1 to 8, and 12 to 28. FIG. 1 is a flowchart showing the whole process of creating embroidery data executed by the device 1 (from retrieving the original picture A to completing the embroidery data). FIGS. 2 to 8 are flowcharts respectively showing the typical procedures in steps S2 to S8 of FIG. 1.

In order to create embroidery data, an original color picture A (a color photograph of a maple leaf shown in FIG. 12, for instance) is first scanned by the image scanner 9 in step S1. The image data of the picture A is created and stored in the original image data area in the RAM 4. This image data is expressed as bit-map data in RGB values, wherein each of color components R, G and B has 256 levels on each pixel.

Figure 13:
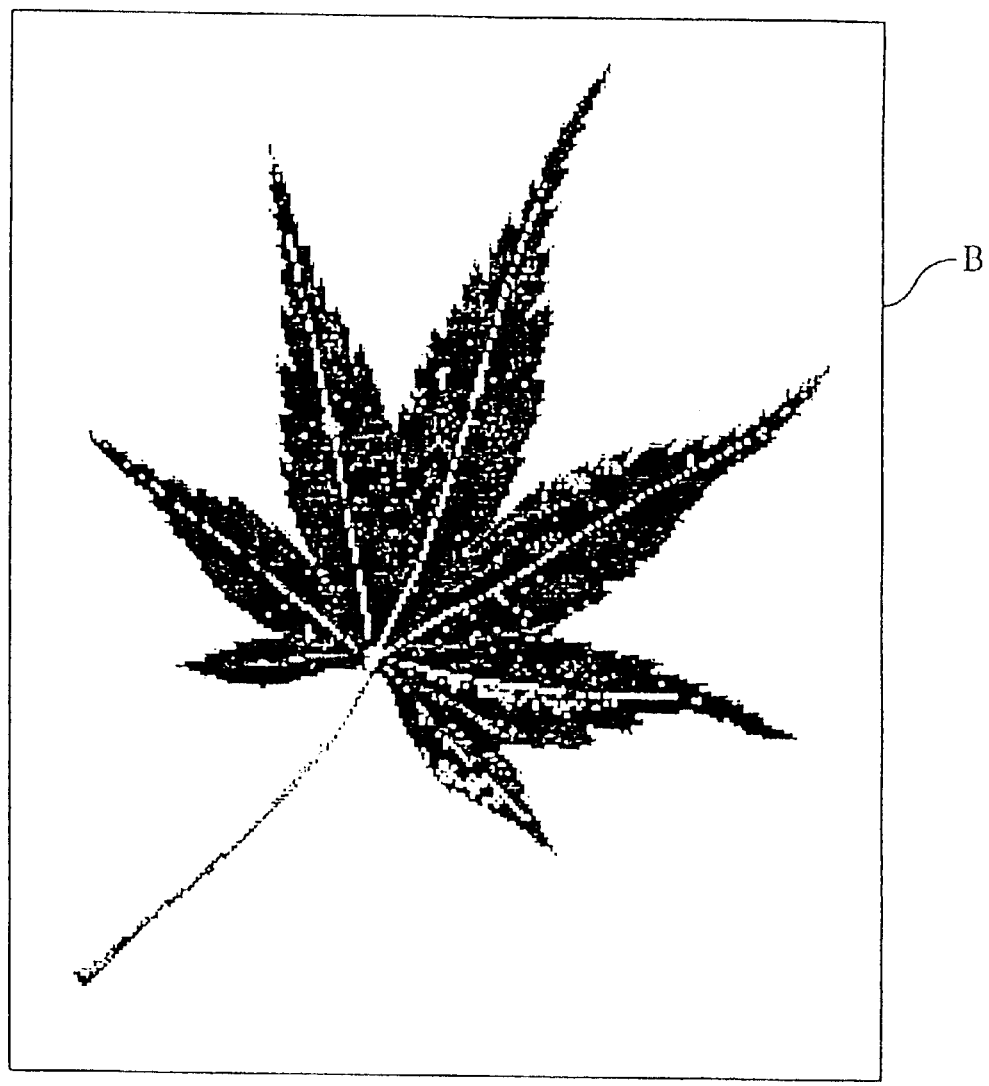
FIG. 13 is a picture B obtained by reducing the number of colors in the original picture A to 7 (including the color of the background)
Figure 14:
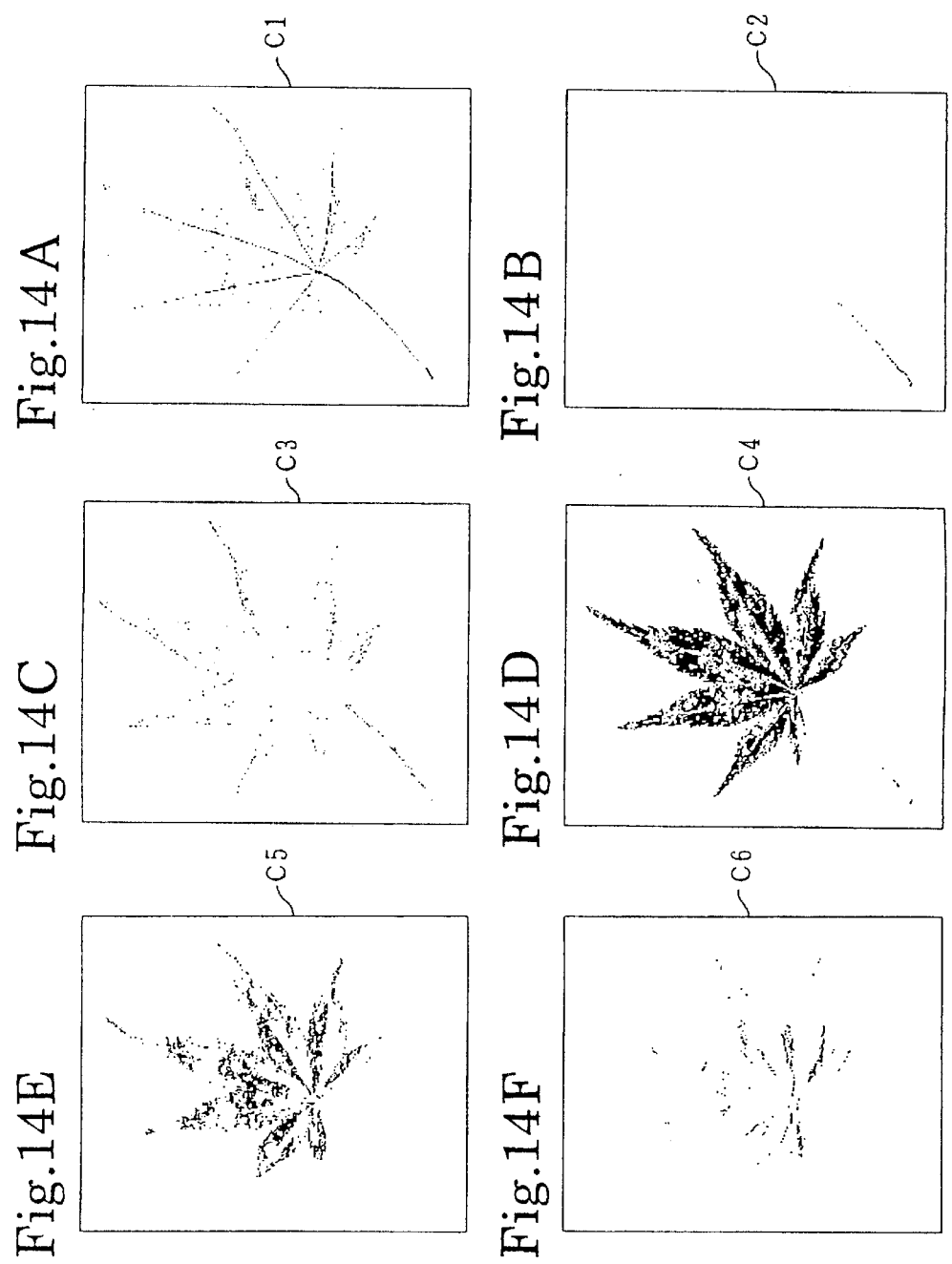
FIGS. 14A to 14F respectively show image planes C1 to C6 obtained by fragmenting the picture B on each color.
Figure 15:
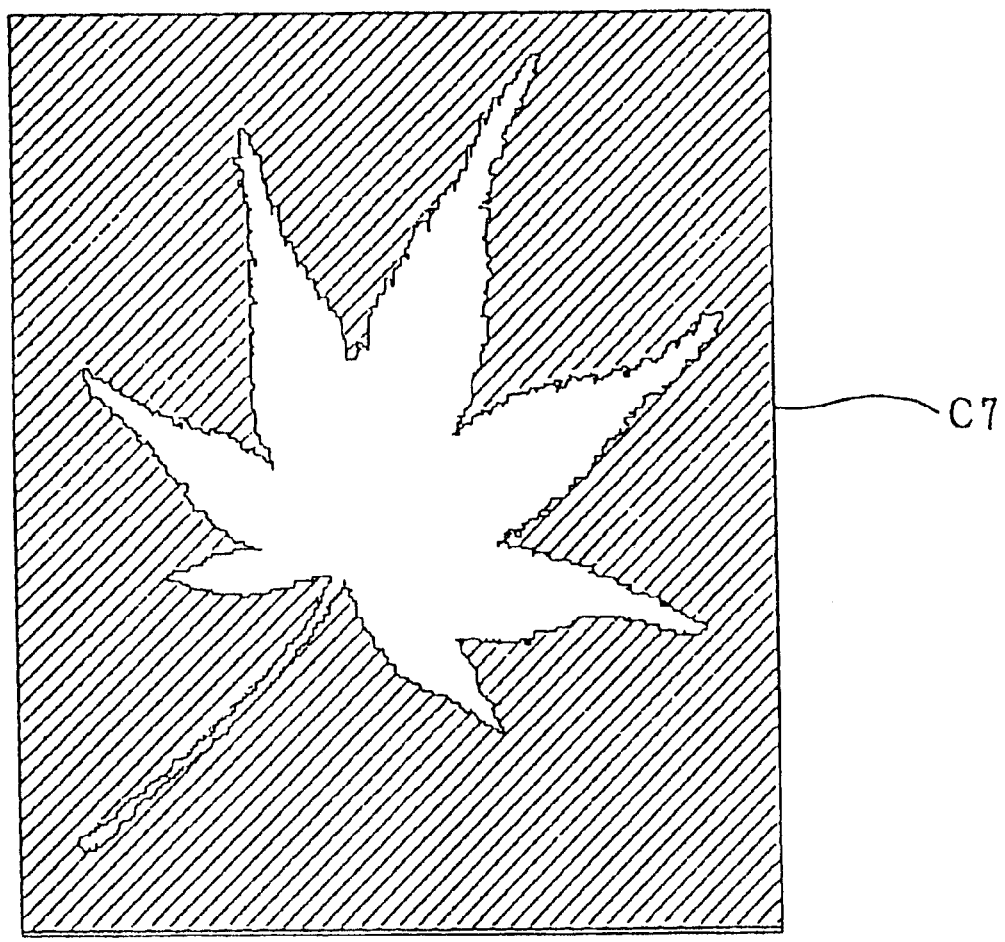
FIG. 15 shows the background area of the picture B.

Then, the number of colors in the image data is optionally reduced to N in step S2. Concretely, an operator first inputs a desired number of the colors in step S21 of FIG. 2. In step S22, the histogram of RGB values is prepared against all the pixels in the image data. In step S23, N colors with high frequency of use are selected as representative colors by way of the histogram. Then, the colors of all the pixels are replaced with one of the representative colors in step S24. The number N may be predetermined as a fixed value. When replacing the color of pixels in step S24, the distance D of the RGB values between each pixel and a representative color is first calculated by the following equation:

$$D=\{(r1-r2)^2+(g1-g2)^2+(b1-b2)^2\}^{0.5}$$

wherein (r1, g1, b1) and (r2, g2, b2) are respectively defined as the RGB values of a pixel and the RGB values of a representative color. The color of the pixel is replaced with the representative color having the closest distance D therebetween. Thus, the whole image data is colored in N representative colors. Suppose the number N is herein 7 (including the color of the background), when reducing the number of the colors in the picture A. The representative colors are, for example, light-yellow, yellow, dark-yellow, light-green, green, dark-green and white (as the background). All of the pixels are colored, in one of the representative colors, whereby the image B is obtained with 7 colors as shown in FIG. 13. Preferably, this image B is displayed on the display unit 6.

Figure 3:
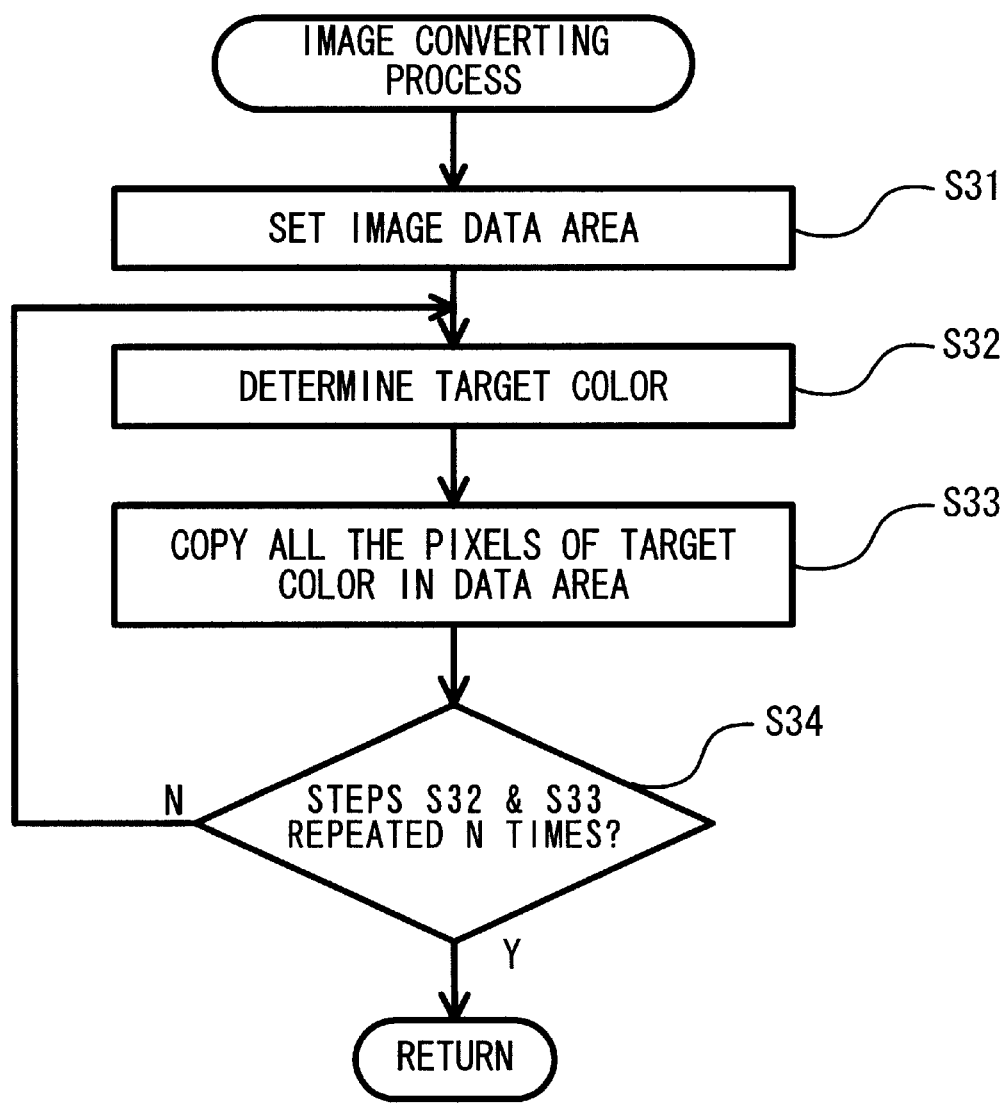
FIG. 3 is a flowchart showing the routines in step S3 of FIG. 1.

After reducing the number of the colors in the image data, the image data is converted into image planes on each representative color in step S3. As shown in FIG. 3, N image plane data areas are first set against each of the image planes in the RAM 4 in step S31. One of N representative colors in the image data is focused as a target color in step S32. In step S33, all the pixels of the target color are extracted and copied in one of the image data plane areas. The above-described routines are repeated N times on each representative color and on each data area in step S34. Therefore, the image data is converted into N image planes. For example, the image B shown in FIG. 13 is converted into 7 image planes: image planes C1 to C6 shown in FIGS. 14A to 14F and a hatched image plane C7 shown in FIG. 15. In this case, the image planes C1 to C6 are respectively light-yellow, yellow, dark-yellow, light-green, green, and dark-green. The image plane C7 corresponds to the background. Herein, the embroidery data is not created against the background (in other words, embroidery is not formed on the background) in order to simplify the present embodiment. Accordingly, the image plane C7 is excluded from the embroidery area. The process of creating embroidery data will be hereinafter explained, using 6 image planes C1 to C6.

Figure 4:
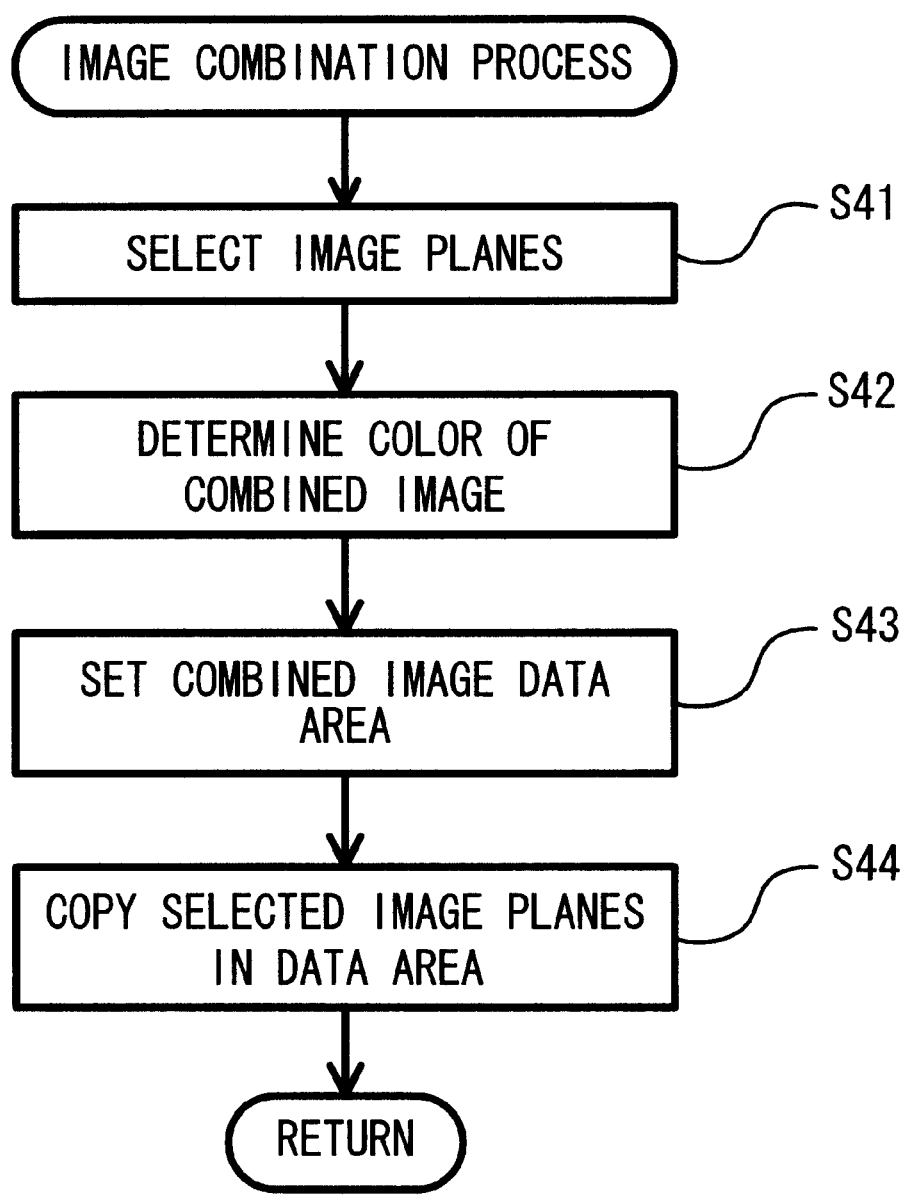
FIG. 4 is a flowchart showing the routines in step S4 of FIG. 1.

Next, pluralities of image planes are combined into one in step S4, if it is necessary. If it is not necessary, the next step S5 (discussed below) is executed. As shown in FIG. 4, an operator first selects pluralities of image planes that will be combined into one with operation of the keyboard 7 or the mouse 8 in step S41. The color of the combined image is also selected in step S42.

Figure 16A:
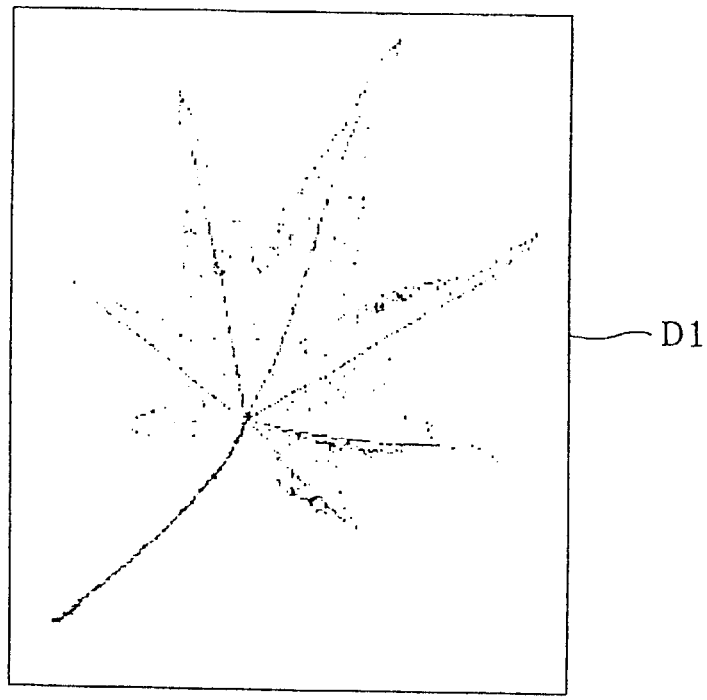
FIG. 16A shows a combined image plane D1 in which the image planes C1 to C3 are combined.
Figure 16B:
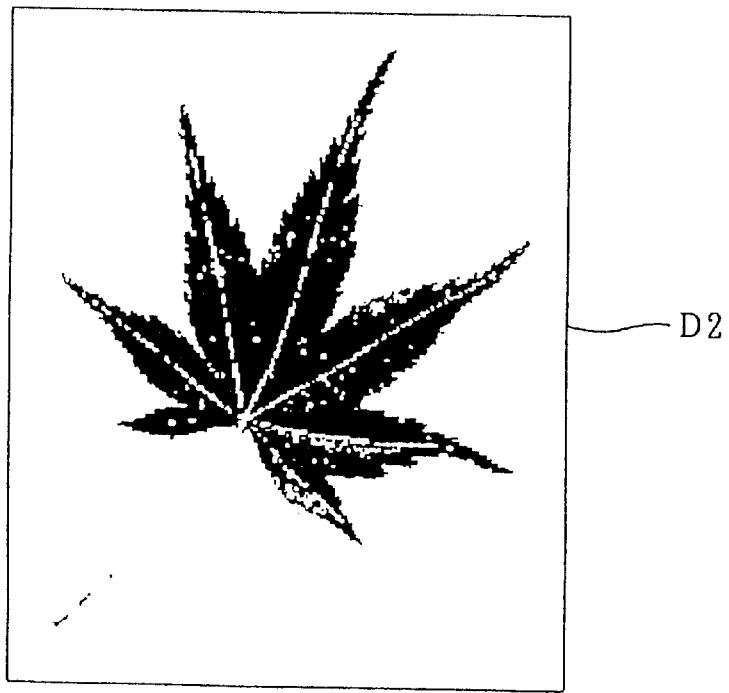
FIG. 16B shows a combined image plane D2 in which the image planes C4 to C6 are combined.

A combined image data area is set in the RAM 4 in step S43, whereupon the image data of all the image planes selected in step S41 is copied in this data area in step S44. At the same time, the information on the colors of the copied image planes is converted into the color information determined in step S42. Now, suppose the image planes C1 to C3 shown in FIGS. 14A to 14C are combined into one and the image planes C4 to C6 shown in FIGS. 14D to 14F are combined into one. The combined image plane D1 is created from the image planes C1 to C3 as shown in FIG. 16A, at the same time, the combined image plane D2 is created from the image planes C4 to C6 as shown in FIG. 16B. The combined image planes D1 and D2 are yellow and green respectively in this case.

Next, the image planes are edited and revised in steps S5 and S6, wherein step S5 includes deletion process and step S6 includes restoration process.

Figure 5:
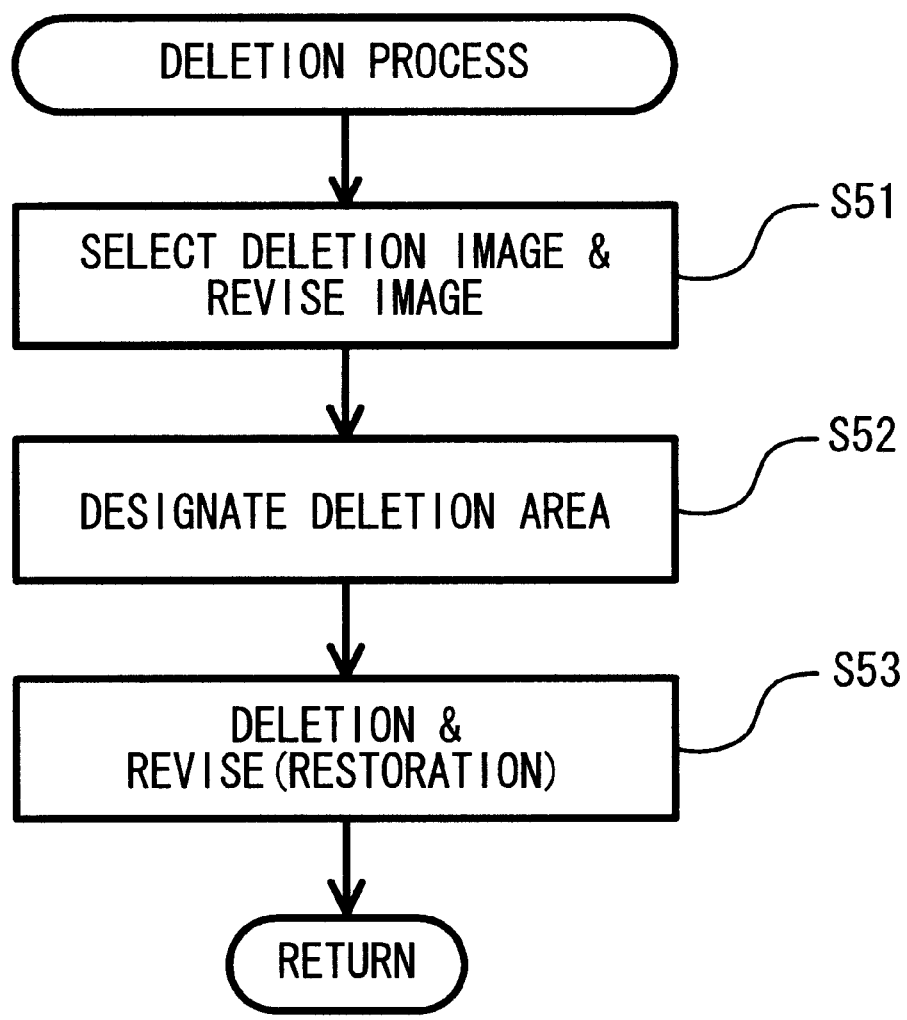
FIG. 5 is a flowchart showing the routines in step S5 of FIG. 1.
Figure 17A:
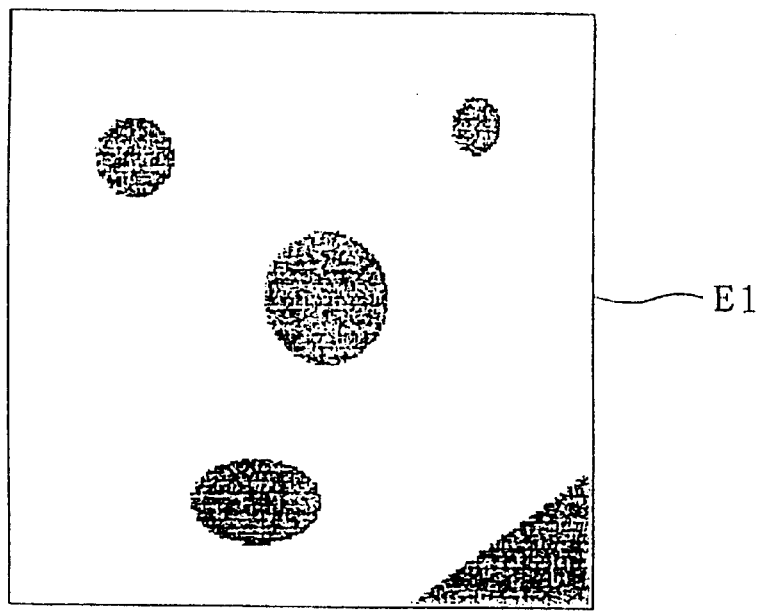
FIG. 17A shows an expanded image E1 to which the image D1 is partially expanded.
Figure 17B:
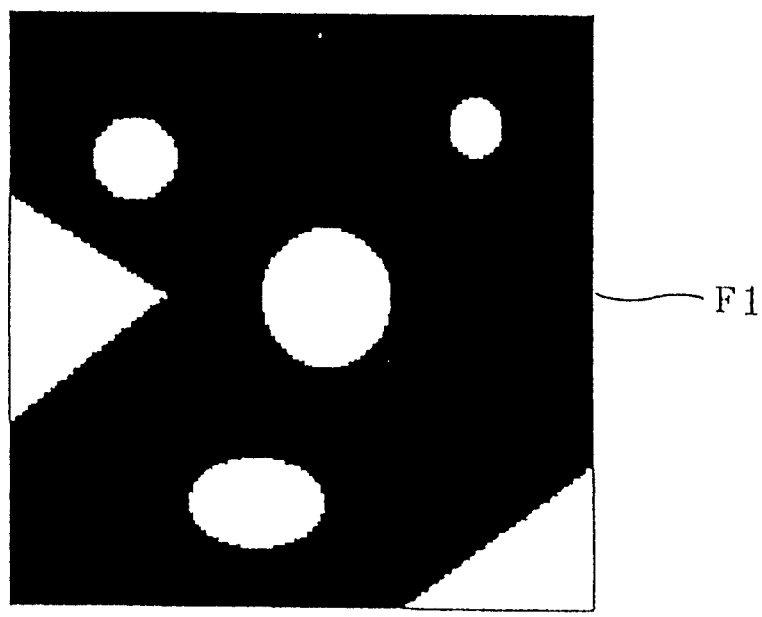
FIG. 17B shows an expanded image F1 to which the image D2 is partially expanded.
Figure 18A:
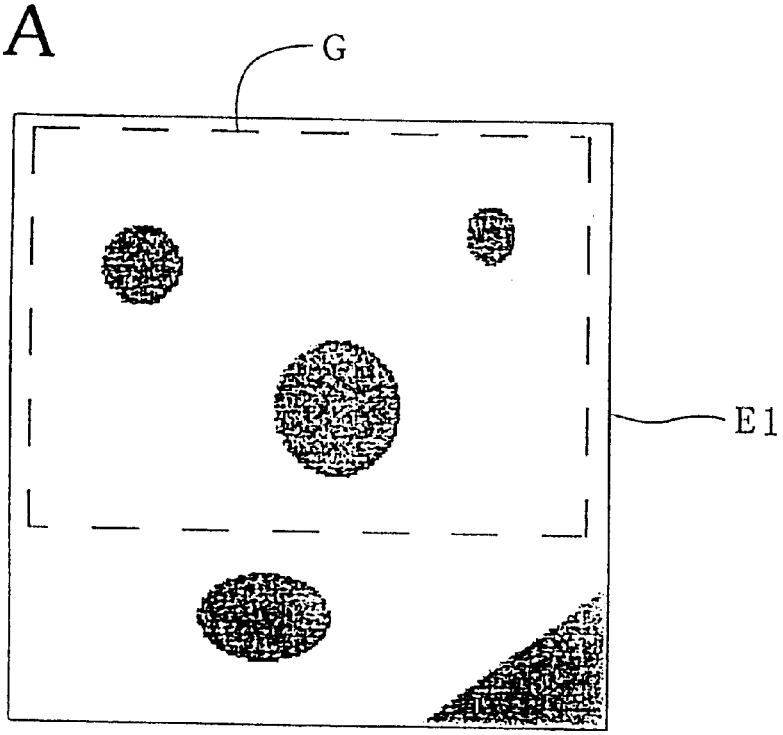
FIGS. 18A and 18B respectively show the expanded images E1 and F1 on which a deletion area G is designated.
Figure 18B:
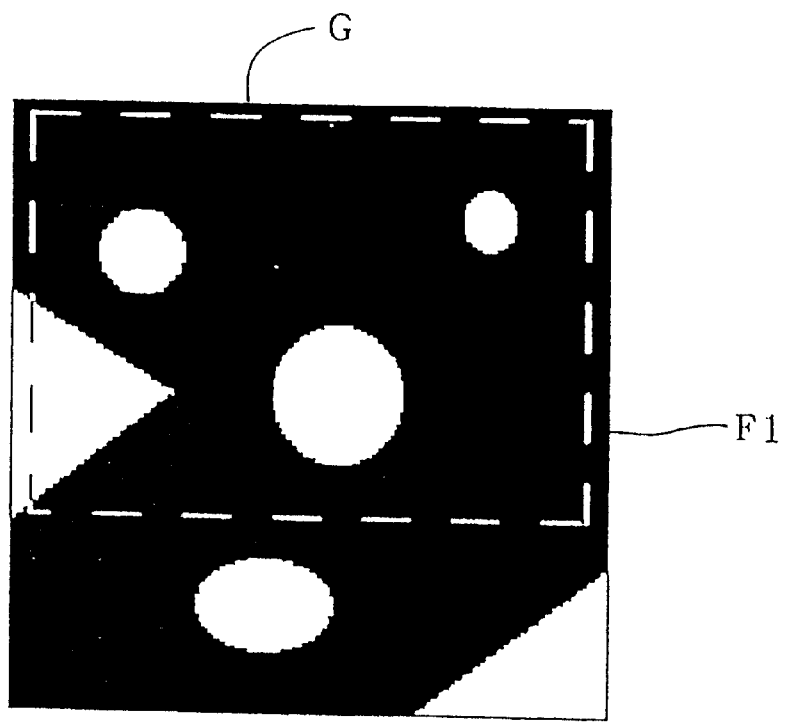
Figure 19A:
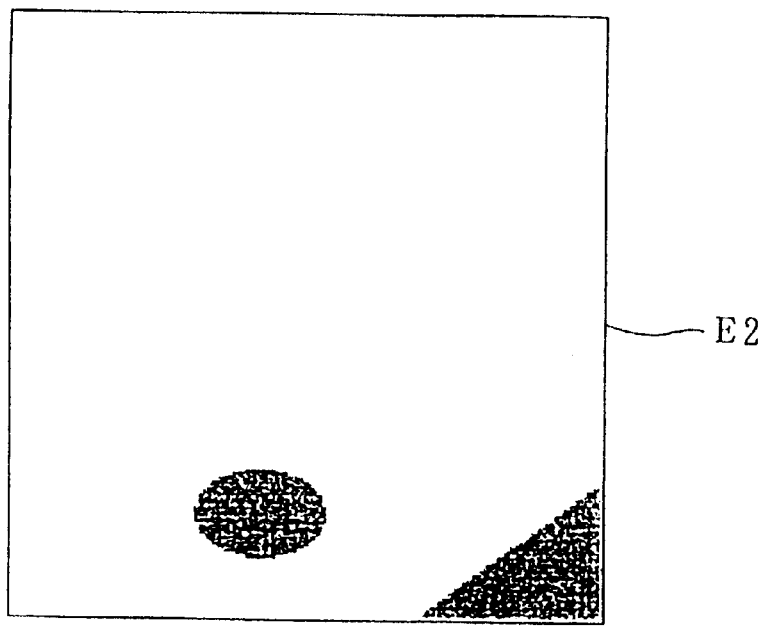
FIG. 19A shows an expanded image E2 after pixel information within the deletion area G is deleted from the image E1 in the edit process.
Figure 19B:
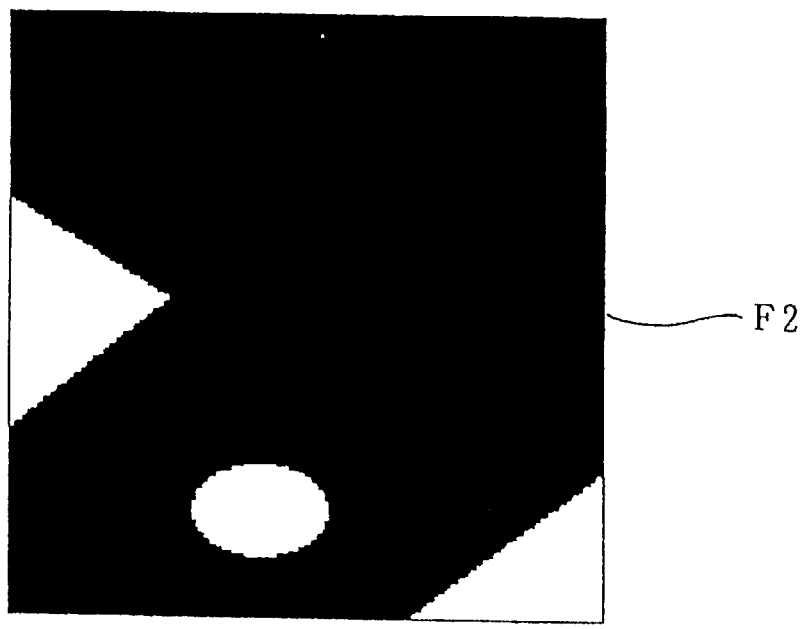
FIG. 19B shows an expanded image F2 after the image F1 is revised in the revise process corresponding to the edit of the image E1.
Figure 20A:
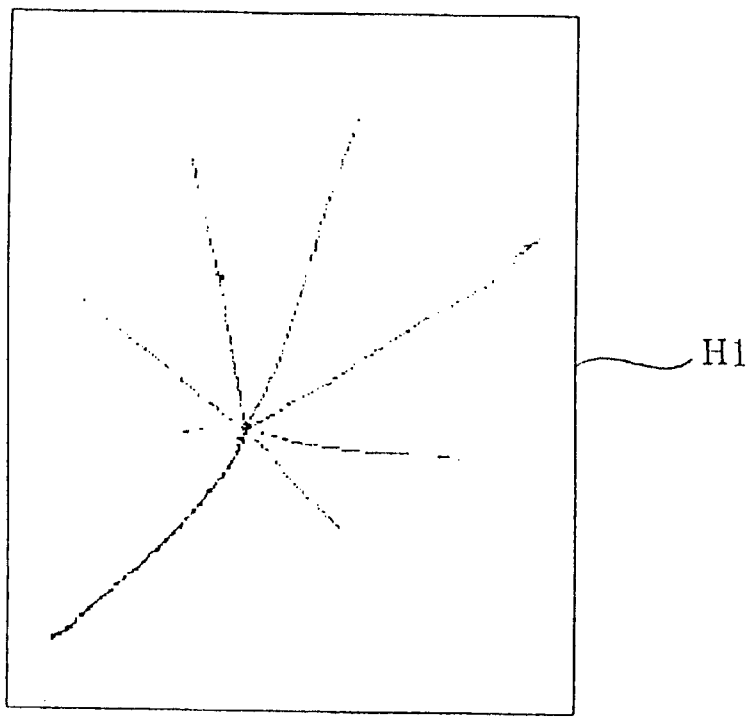
FIGS. 20A and 20B respectively show edited image planes H1 and H2 after editing and revising the images D1 and D2.
Figure 20B:
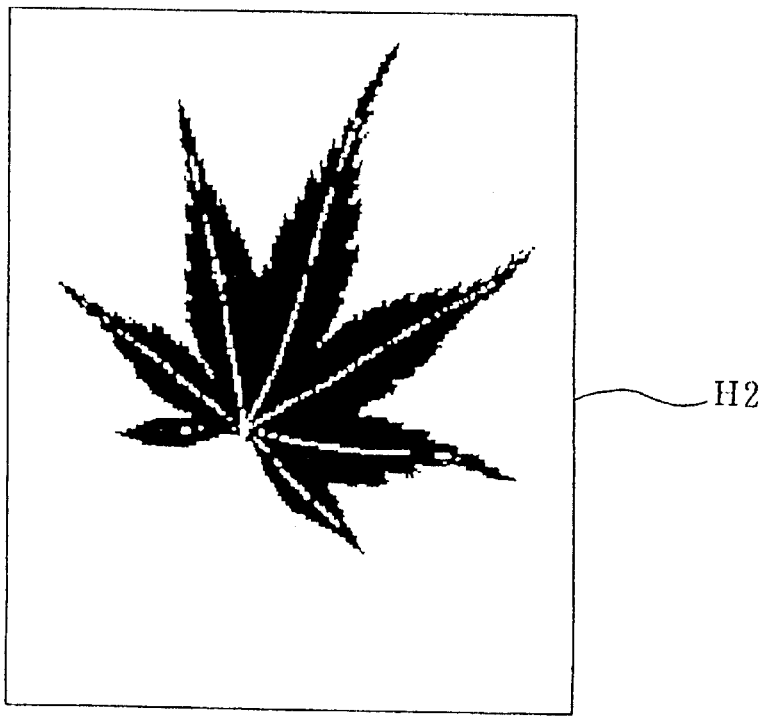

In the case of editing the image planes in the deletion process of step S5, an operator selects an image plane or a combined image plane from which pixel information will be deleted in step S51 of FIG. 5. (This image is hereinafter referred to as a deletion image.) The operator also selects the other image plane or the other combined image plane that will be revised in correspondence with the preceding deletion in step S51. (This image is referred to as a revision image hereinafter.) The deletion image is displayed on the display unit 6, in which a part of this deletion image might be expanded. The operator designates a deletion area in the deletion image on the display unit 6 with operation of the keyboard 7 or the mouse 8 in step S52. In step S53, pixel information within the designated area is deleted from the deletion image. At the same time, the revision image is automatically revised (in this case, restored with the pixel information corresponding to the preceding deletion) in step S53. More specifically, as shown in FIG. 16A, there exist innumerable microscopic spots in the blade of the image D1. There also exist voids in the blade of the image plane D2 at the positions corresponding to the innumerable microscopic spots, as shown in FIG. 16B. It is desirable to delete these spots and voids in order to obtain more favorable images. Thus, the image planes D1 and D2 are now adopted as the deletion image and the revision image respectively. The image plane D1 is partially expanded and displayed as an expanded image E1 on the display unit 6, as shown in FIG. 17A. An expanded image F1 shown in FIG. 17B represents the area in the image D2 corresponding to the image E1. As shown in FIG. 18A, a deletion area G (surrounded by a broken line) is designated on the image E1 with operation of the keyboard 7 or the mouse 8. The area corresponding to the deletion area G is specified in the image F1 and surrounded by a white broken line as shown in FIG. 18B. The pixel information on the spots is deleted from the image E1, thereby, providing the image E2 shown in FIG. 19A. At the same time, the image F1 is restored with the pixel information so as to fill the voids in the image F1, thereby, providing the image F2 shown in FIG. 19B. In this way, by deleting all the unnecessary spots from the image D1, the edited image HI shown in FIG. 20A is obtained. The image D2 is automatically revised, whereby the edited image H2 is obtained as shown in FIG. 20B.

Figure 21A:
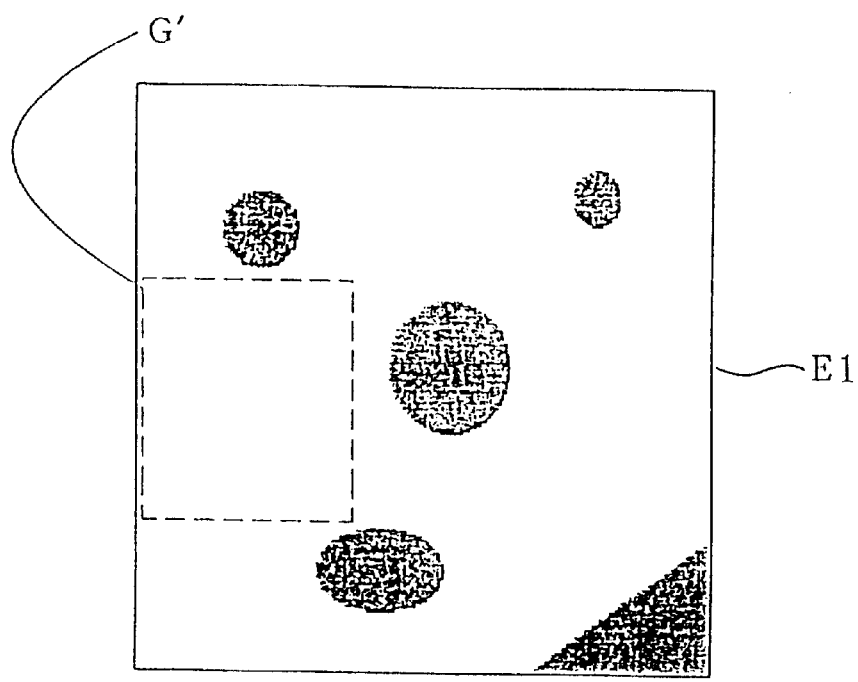
FIGS. 21A and 21B respectively show expanded images E1 and F1 on which a meaningless deletion area G' is designated.
Figure 21B:
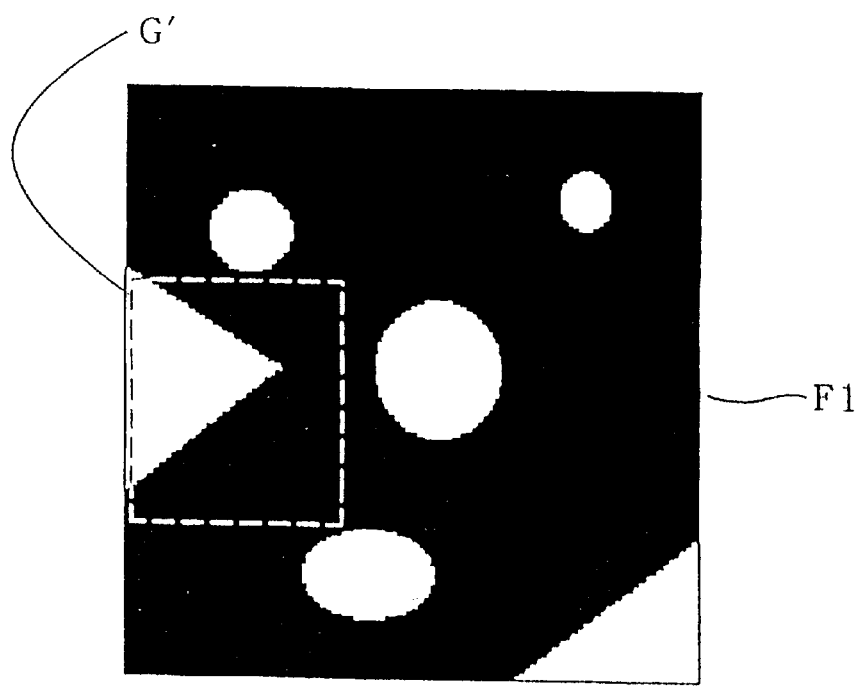
Figure 22:
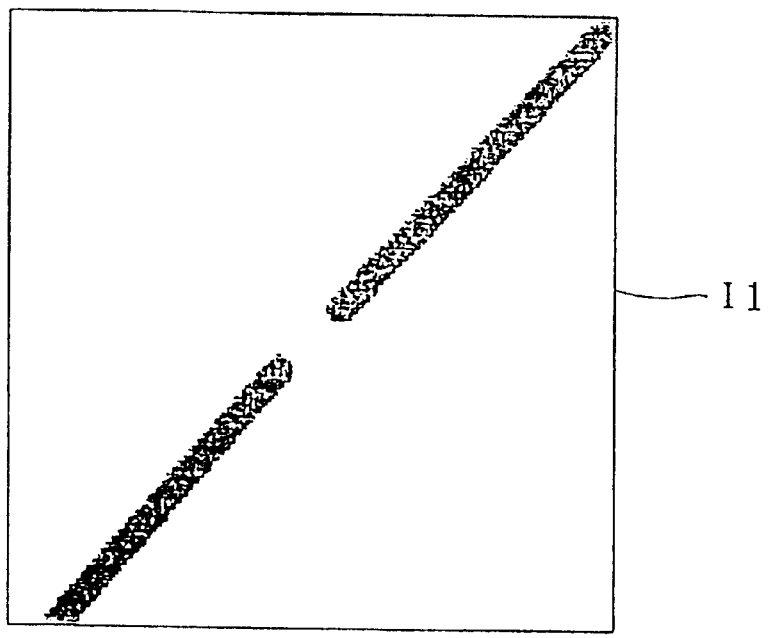
FIG. 22A shows an expanded image I1 to which the image plane H1 is partially expanded.
FIG. 22B shows an expanded image J1 to which the image plane H2 is partially expanded.
Figure 22:
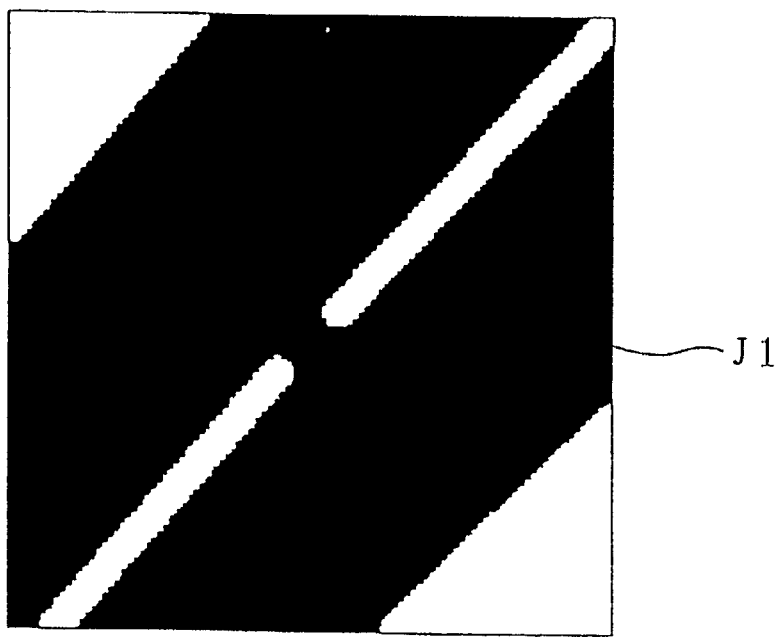
Figure 23:
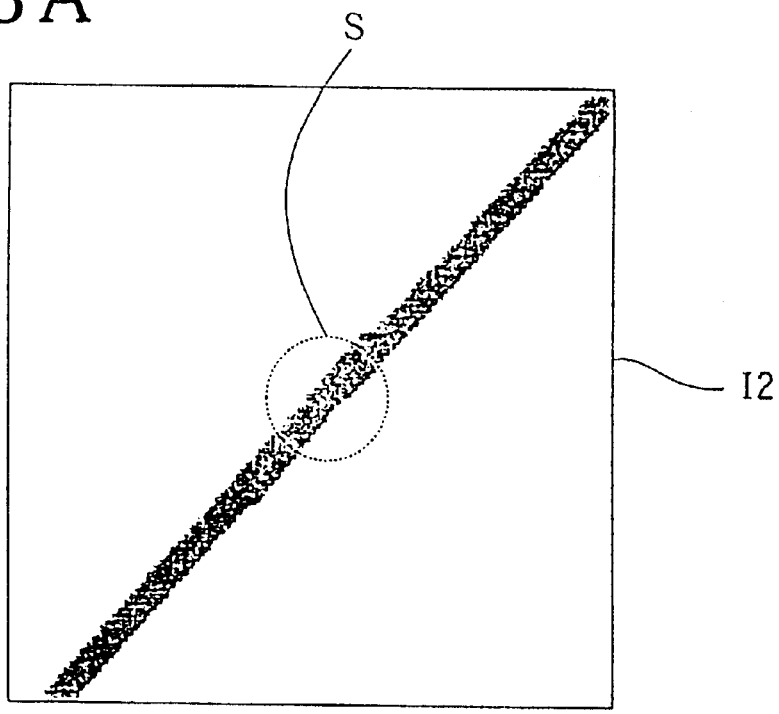
FIG. 23A shows an expanded image I2 after the image I1 is optionally supplemented with pixel information in the edit process.
FIG. 23B shows an expanded image J2 after the image J1 is revised in the revise process corresponding to the edit of the image I1.
Figure 23:
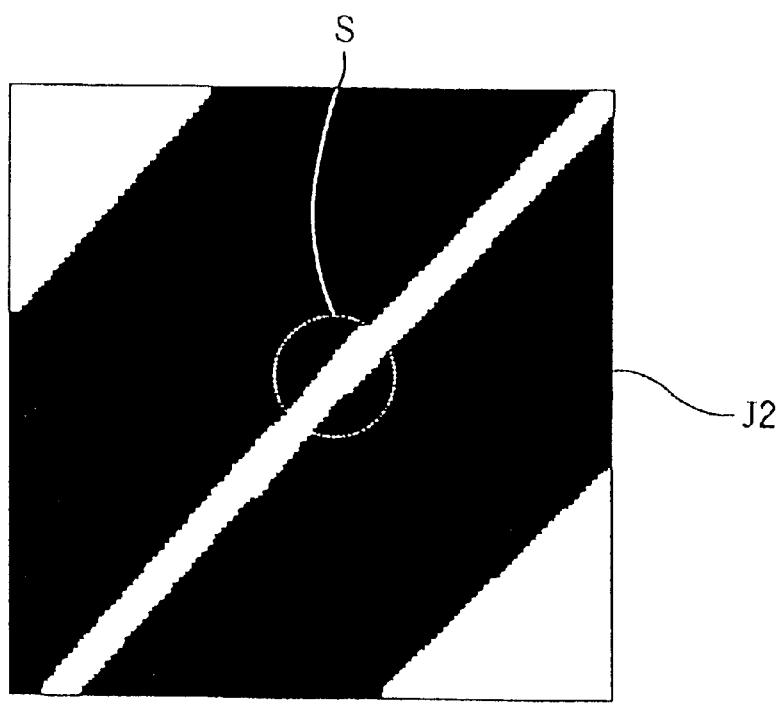
Figure 24:
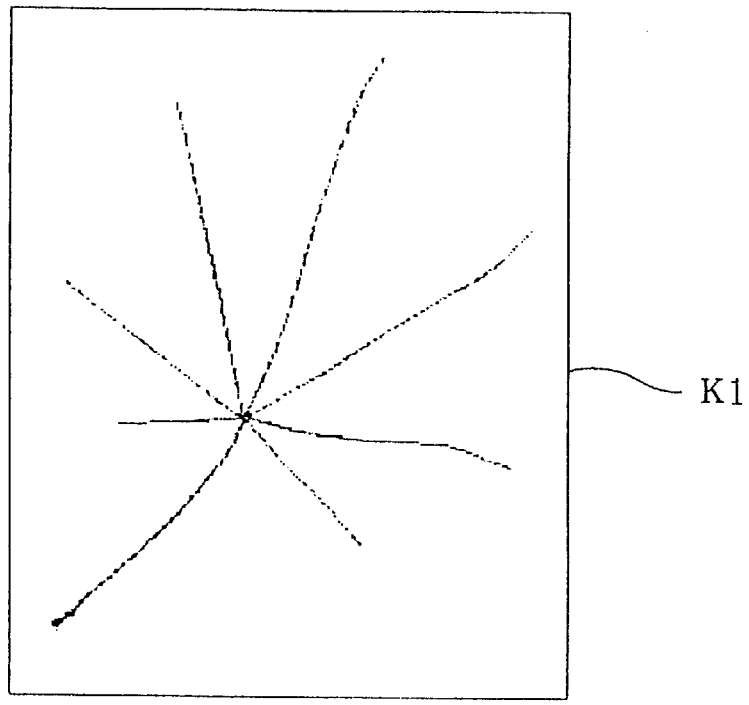
FIGS. 24A and 24B respectively show edited image planes K1 and K2 after editing and revising the image planes H1 and H2.
Figure 24:
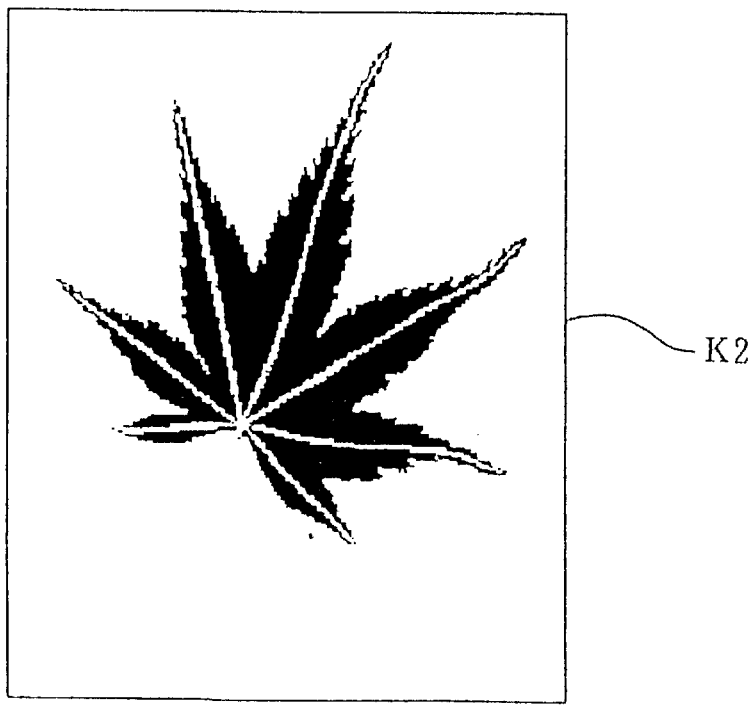

In the present embodiment, even if setting the meaningless deletion area G' on the image E1, as shown in FIG. 21, the editing process and the revising process are not executed.

Figure 6:
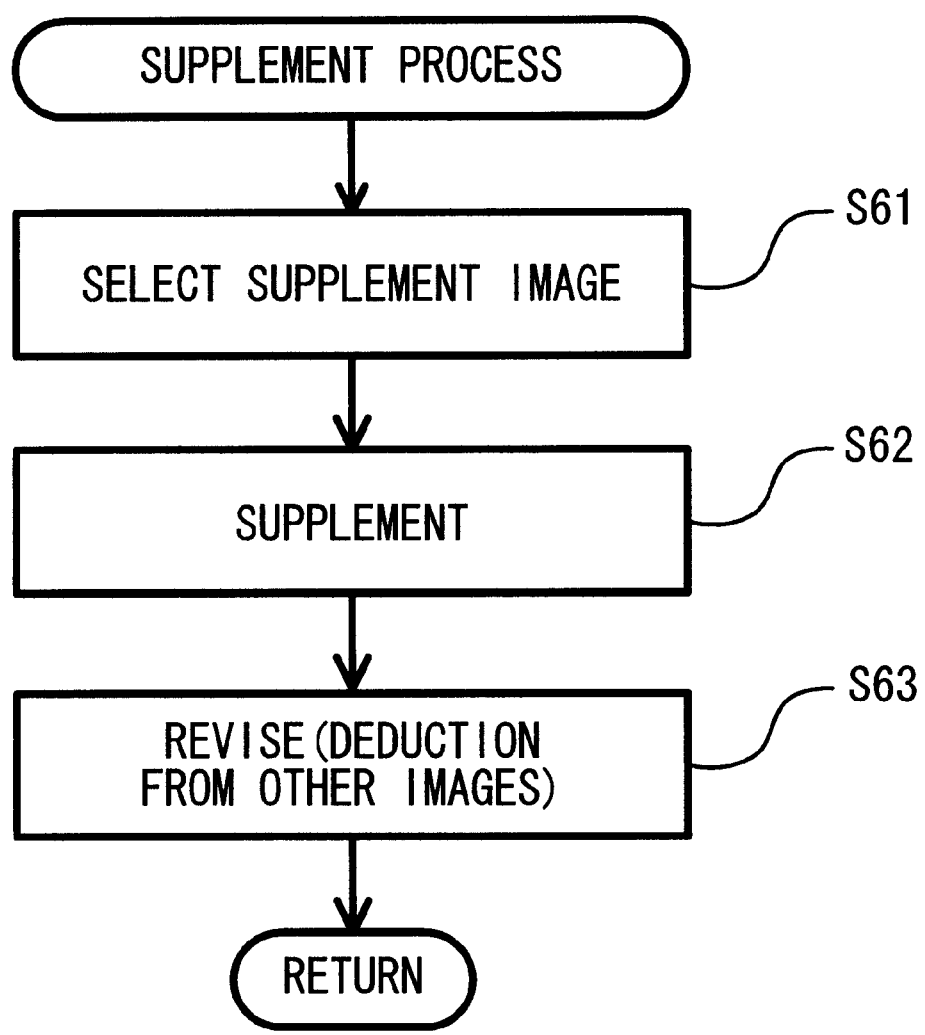
FIG. 6 is a flowchart showing the routines in step S6 of FIG. 1.
Figure 7:
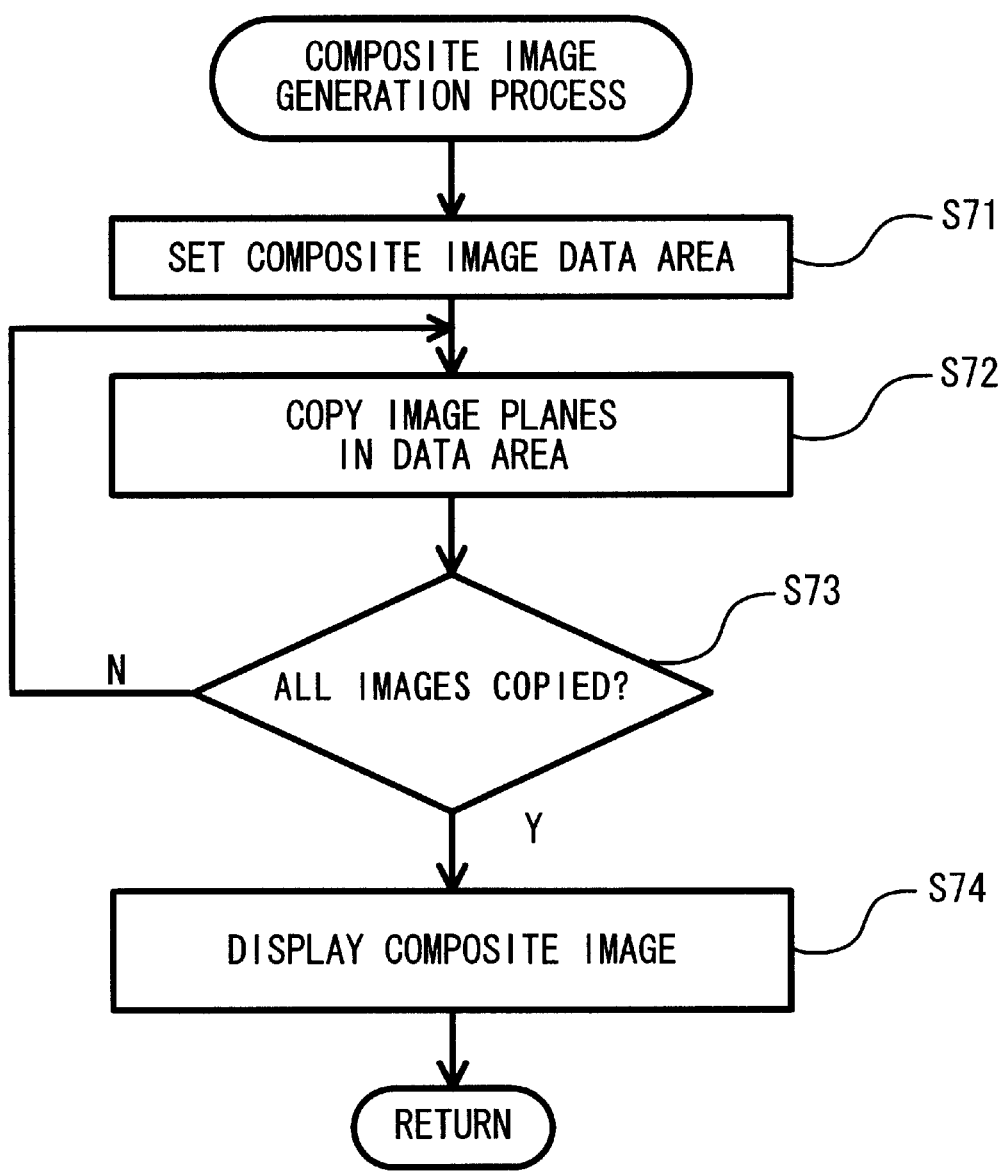
FIG. 7 is a flowchart showing the routines in step S7 of FIG. 1.
Figure 8:
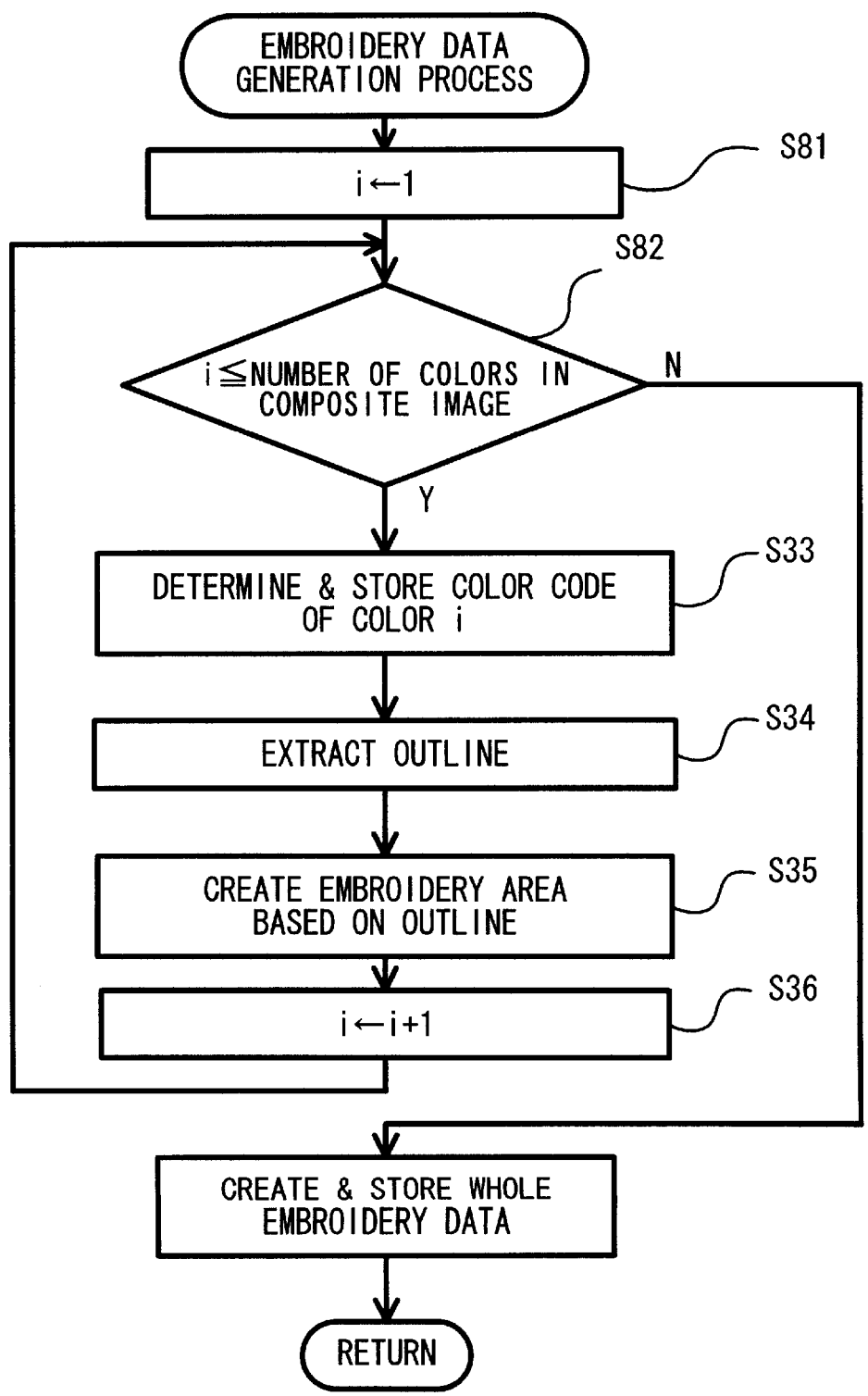
FIG. 8 is a flowchart showing the routines in step S8 of FIG. 1.

In the case of editing the image planes in the supplement process of step S6, an operator selects a monochrome image that will be supplemented in step S61 of FIG. 6. This image is hereinafter referred to as a supplemental image. The supplemental image is displayed on the display unit 6, on which this supplemental image is optionally supplemented with pixel information with operation of the keyboard 7 or the mouse 8 in step S62. In correspondence with this preceding supplement, all the other image planes are automatically revised so that the pixel information corresponding to the preceding supplement is deducted therefrom. Concretely, it is desirable to connect the veins of the image H1 (shown in FIG. 20A) in order to obtain a more favorable image. Thus, the image H1 is now adopted as the supplemental image. The image H1 is partially expanded and displayed as an expanded image I1 on the display unit 6, as shown in FIG. 22A. An expanded image J1 shown in FIG. 22B represents the area in the image H2 corresponding to the image I1. A supplemental area S is designated and surrounded by a broken line. In step S62, this supplemental area S is supplemented with the pixel information with operation of the keyboard 7 or the mouse 8 so t at the disconnected veins are joined. Thus, the image 12 is obtained as s own in FIG. 23A wherein the veins are connected. Incidentally, the pixel information on the disconnected veins is deducted from the image J1 in step S63, whereby the image J2 is obtained. In this way, by optionally supplementing the image H1 with pixel information, the image K1 is obtained as shown in FIG. 24A. The image H2 is automatically revised into the image K2 as shown in FIG. 24B.

These steps S5 and S6 may be reversed, or repeated many times. Both, or, one of the steps S5 and S6 may not be executed, if unnecessary.

Figure 25:
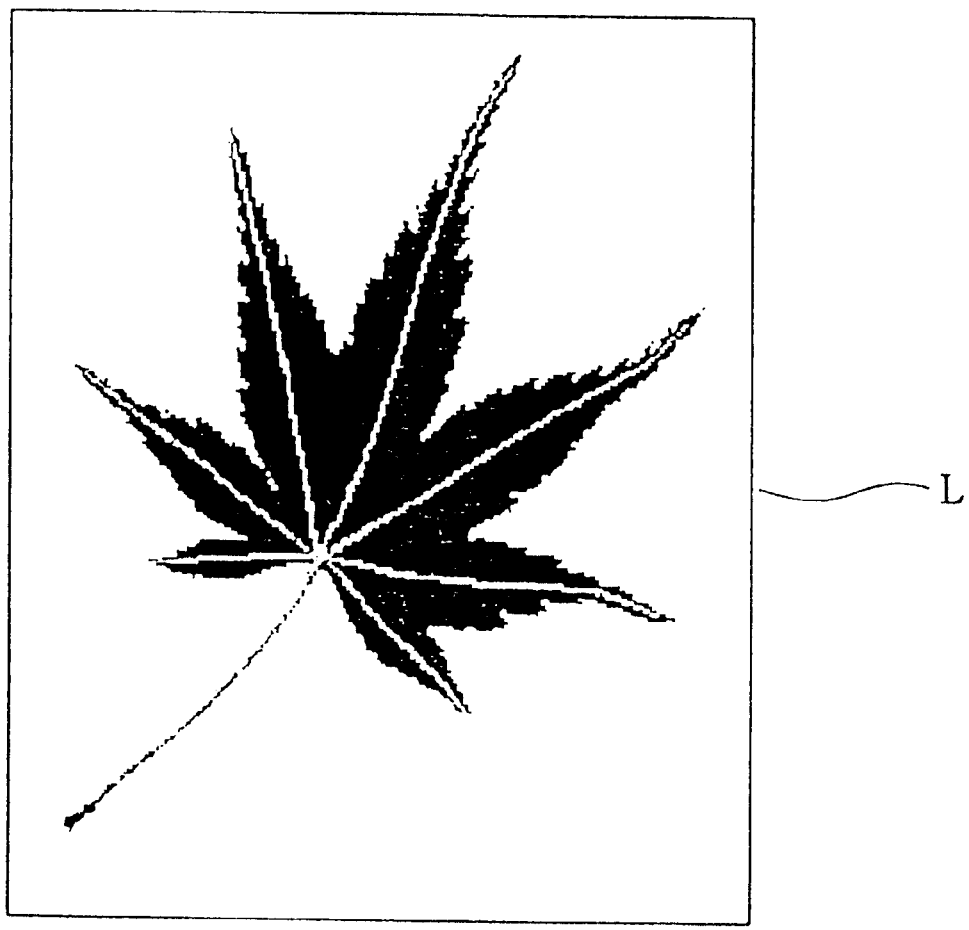
FIG. 25 shows a composite image L of the image planes K1 and K2.

After editing and revising the images as described above, the edited and the revised image planes are formed into a composite image plane in step S7. A composite image plane data area is first set in the RAM 4 in step S71 of FIG. 7, whereupon an image plane is copied in this composite image data area in step S72. The step S72 is repeated against all the image planes, and which is ensured in step S73. Later, the created composite image plane is displayed on the display unit 6 in step S74. For example, the composite image L is obtained as shown in FIG. 25 from the images K1 and K2 shown in FIGS. 24A and 24B. This image L is formed of two image planes: the yellow veins and stem, and the green blade. Thus, it is possible to ensure that the rendering of the embroidery agrees with operator's image, when looking at the composite image L. Although the composite image consists of all the image planes by way of example in the present embodiment, it may be composed of pluralities of the image planes selected by an operator.

Figure 26:
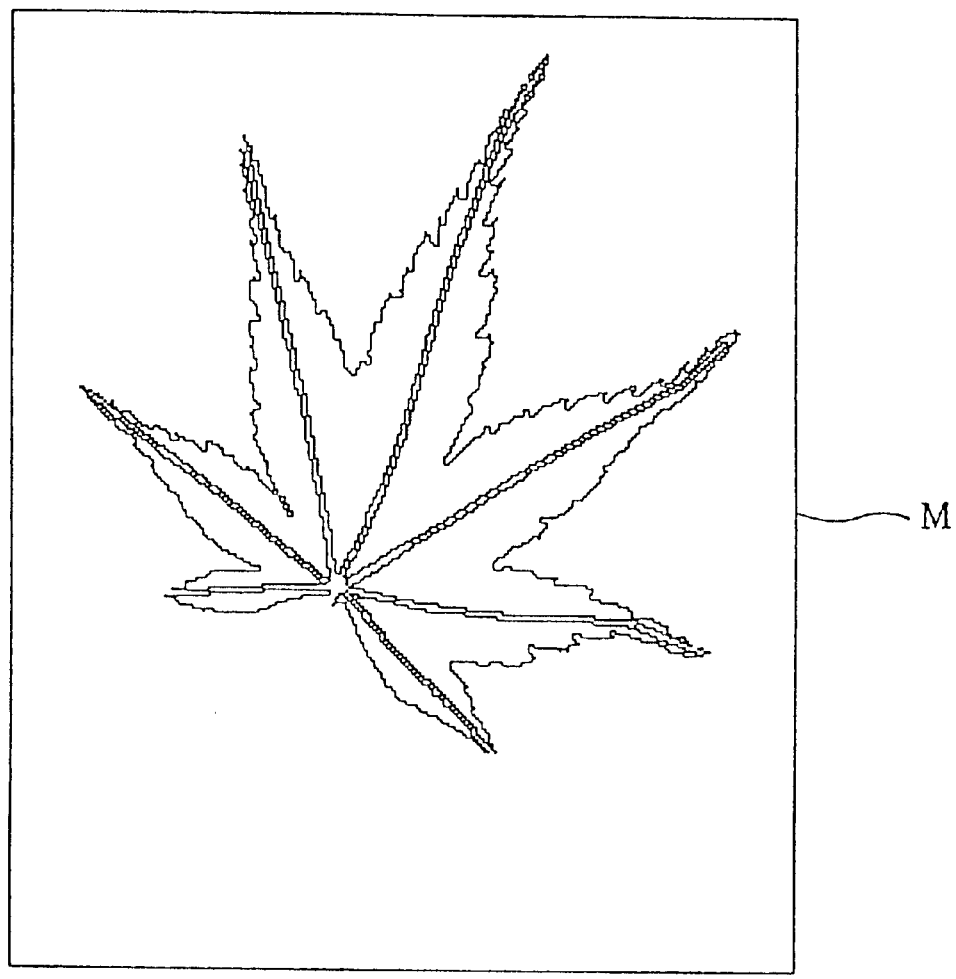
FIG. 26 shows the outline M of the embroidery area that corresponds to the blade.
Figure 27A:
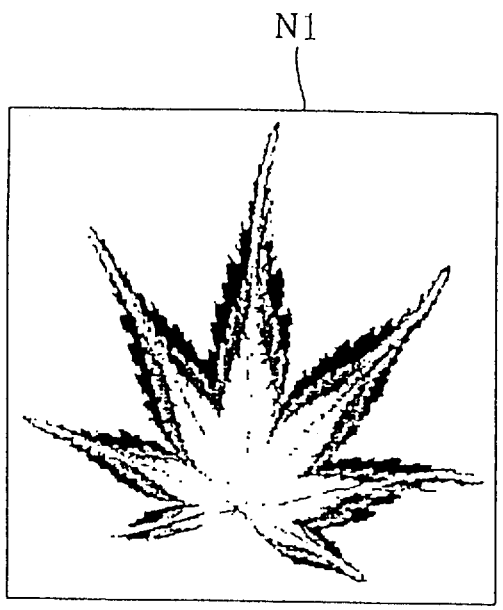
FIGS. 27A to 27D show various designs N1 to N4 for embroidery.
Figure 27B:
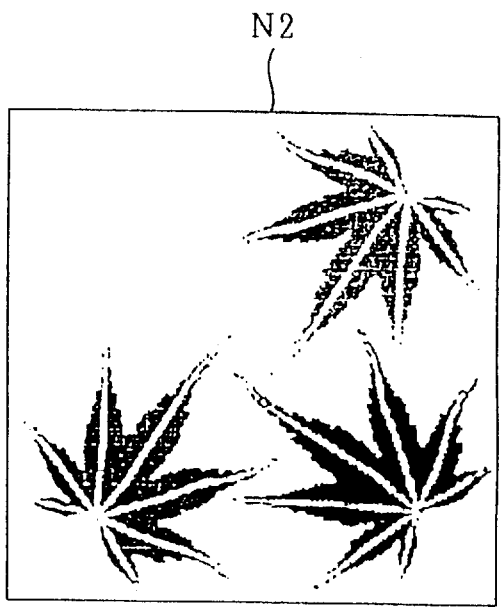
Figure 27C:
Figure 27D:
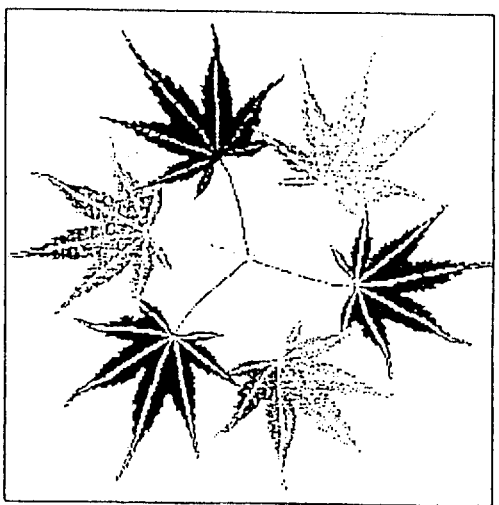

Finally, in step S8, the embroidery data is created from the composite image data. A variable i starts from 1 in step S81 of FIG. 8. If the variable i is less than the total number of colors in the composite image (the number of image planes) ("Yes" in step S82), a color code (thread-color) of each embroidery area is determined against the color i in step S83, and stored in the RAM in step S84. The color code is selected against the embroidery area based on the thread-color look-up table shown in FIG. 11 so as to have the closest distance of RGB values between the color i and the color code. Or, an operator may optionally set or modify the thread-color data. In step S84, the image plane of the color i is shaped by, for instance, extracting the outline of that image or the central line of an edge. For instance, the outline M is extracted as shown in FIG. 26 from the image K2 shown in FIG. 24B. The inside of the outline M corresponds to an embroidery area colored in the same to the image K2. In step S85, the embroidery data (stitch data, in this case) of the color i is created based on the outline data, and stored in the embroidery data area in the RAM 4. Although there are provided various methods to create embroidery data, the stitch data generation method, for example, is applied to the present embodiment. By this stitch data generation method, the embroidery area surrounded by the outline is converted into pluralities of square blocks. The square block is defined by a pair of major sides along the embroidering direction and a pair of minor sides that cross the major sides. Stitch points are set on the major sides of each block with a fixed thread density so as to fill the embroidery area with the formed stitches. After creating the embroidery data against the embroidery area of the color i in this way, the variable i increases by one in step S86. The steps S82 to S85 are repeated against the image plane of the color i+1. When finishing the above-described steps against all the image planes ("No" in step S82), the entire embroidery data is completed, in which the thread-color data accompanies the embroidery data on each image plane. This entire embroidery data is stored in the RAM 4 in step S87.

Further, the entire embroidery data is stored in the memory card 11 through the memory card connector 10. By setting this memory card 11 to an embroidery sewing machine, the composite image L of a maple leaf shown in FIG. 25 is embroidered, based on the embroidery data. Various designs, such as the designs N1 to N4 shown in FIG. 27, can be optionally embroidered by editing (for example, expanding, reducing, rotating, reversing or copying) the image data or the embroidery data of the composite image L.

As mentioned above, an original picture can be easily edited in the present embodiment, even if the original picture is colored in subtle gradation of various colors. Heretofore, an operator has to trace the outline of an embroidery area by hand when creating embroidery data. According to the invention, it is however possible to convert the original picture into a relatively few image planes, and to edit the image planes with simple operations so that the image planes have favorable shapes. Furthermore, the thread-color data automatically accompanies the embroidery data in correspondence with the color of each image plane. Thus, an operator does not need to designate the thread-color specifically.

As a result, the operations in creating embroidery data are simplified in accordance with the invention, whereby a lot of time and labor can be saved.

Moreover, pixel information of one fragmented image may correspond to pixel information in other N−1 fragmented images, so that when pixel information of image data "A" is edited, corresponding pixel information in the other image data is automatically revised.

Figure 28:
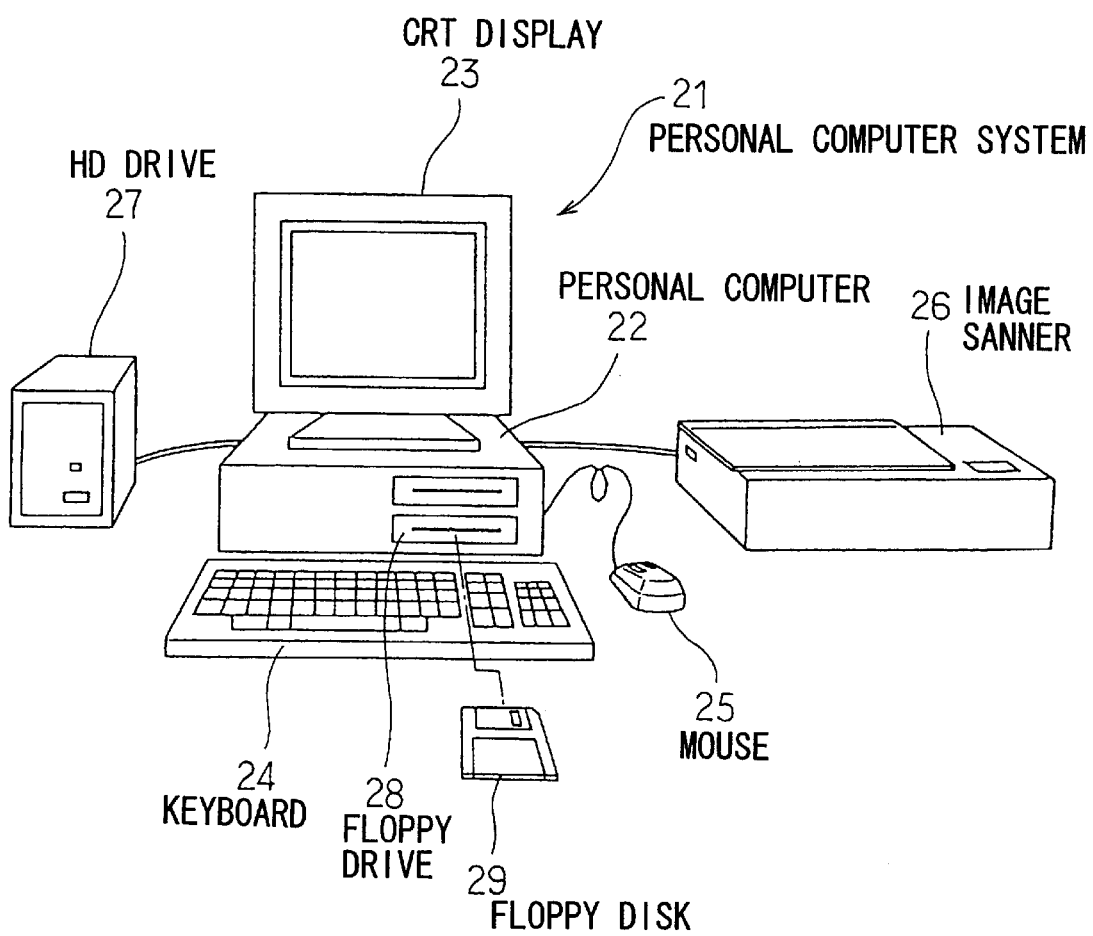
FIG. 28 is a general perspective view of a personal computer system according to another preferred embodiment of the invention.

Now, another embodiment of the invention will be described with reference to FIG. 28. In the former embodiment, the embroidery data generation device is exclusively provided, and driven according to the embroidery data generation program in the ROM 3. Though, images can be processed to create the embroidery data using an ordinary personal computer system 21, according to this embodiment.

This personal computer system 21 comprises a personal computer 22 being connected to a CRT display 23 (display means), a keyboard 24 and a mouse 25 (instruction means), an image scanner 26 (image data input means) and an HD drive 27. The personal computer 22 has a floppy disk drive 28 therein. Thus, a floppy disk 29 which stores an embroidery data generation program (or image processing program) can be set to or removed from the floppy disk drive 28.

In this configuration, the personal computer 22 processes images and creates embroidery data according to the embroidery data generation program stored in the floppy disk 29. Therefore, it is possible to simplify the operations in processing the image data of original color pictures and creating embroidery data in this embodiment as well as in the former embodiment.

The above-mentioned embroidery data generation program (or the image processing program) may be retrieved from an external information processing device through communication by wire, or through radio communication. Further, these programs can be stored in various memories, such as a CD-ROM, a semiconductor memory, a CD-R, a MO, a MD, a PD, a DVD and a magnetic tape, as well as the floppy disk 29.

The invention may be applied only to an image processing device, although it is applied to the embroidery data generation device in the preferred embodiments described above.

While an image scanner is used to input data in the aforementioned embodiments, the image data may also be converted into digital data by a digital camera, and then, input.

Further, the original picture is a color photograph in the above-described embodiments. Though, a handwriting color illustration or a black and white picture may also be used as an original picture, wherein the picture can be colored at operator's will by determining thread-colors.

Still further, the RGB system is not necessarily used for processing images. The Lab system, the Luv system, the YIQ system or the HIS system may be used instead of the RGB system. The uniform quantization method, or the tapered quantization method may be used instead of the equation used in the embodiment, when reducing the number of colors in the image.

Yet further, an industrial sewing machine can be used as an embroidery machine as well as a home-use sewing machine. The embroidery data generation device may be directly connected to the embroidery sewing machine, without giving the embroidery data through the memory card. Or, the embroidery data may be supplied to the embroidery sewing machine through other medium.

It would be apparent to those skilled in the art that various changes and modifications may be made therein without departing from the spirit and the scope of the invention.

In general, the operations in processing images for creating embroidery data is simplified according to the invention, as described above. Thus, the invention makes superior, practical effects on the generation of embroidery data at operator's desire without difficulties.

What is claimed is:

1. An image process device comprising:

an image data input that inputs original image data;

an image converting unit that converts the original image data into a plurality of image planes based on a feature and reduces the number of colors in the original image data to a reduced number;

an image editor that edits the converted image planes; and an image revising unit that automatically revises other image planes based on a preceding edit.

2. The image processing device according to claim 1, wherein the image editor includes a deletion function that deletes pixel information within a designated area of the image plane.

3. The image processing device according to claim 2, wherein the image revising unit serves to automatically restore the pixel information on the designated area of the image plane corresponding to the preceding deletion on the other image plane.

4. The image processing device according to claim 1, wherein the image editor includes an adding function that supplements pixel information into a designated area of the image plane.

5. The image processing device according to claim 4, wherein the image revising unit serves to automatically deduct the pixel information corresponding to the preceding addition from all the other image planes.

6. The image processing device according to claim 1, further comprising:

an image displaying unit that forms a composite image from all the image planes, and displays the composite image.

7. The image processing device according to claim 1, further comprising:

an image combining unit that forms a single image plane from the plurality of image planes.

8. An embroidery data generation device for creating embroidery data, which is essential to control the embroidery workings of a embroidery machine, comprising:

the image processing device of claim 1;

an embroidery data generator that creates embroidery data based on image data of each image plane by adopting the image plane as one embroidery area; and a thread-color determination unit for determining a thread-color based on the color of the image plane, and accompanying thread-color data with the embroidery data.

9. A method for image processing, comprising:

inputting original image data;

converting the original image data into a plurality of image planes based on a feature and reducing the number of colors in the original image data to a reduced number;

editing the converted image planes; and revising automatically other image planes based on a preceding edit.

10. The method according to claim 9, further comprising:

deleting pixel information within a designated area of the image plane.

11. The method according to claim 10, further comprising:

automatically restoring the pixel information on the designated area of the image plane corresponding to the preceding deletion on the other image plane.

12. The method according to claim 9, further comprising:

supplementing pixel information into a designated area of the image plane.

13. The method according to claim 12, further comprising:

automatically deducting the pixel information corresponding to the preceding addition from all the other image planes.

14. The method according to claim 9, further comprising:

forming a composite image from all the image planes; and displaying the composite image.

15. The method according to claim 9, further comprising:

forming a single image plane from the plurality of image planes.

16. A storage medium for storing computer readable programs to enable a computer to perform image processing, comprising:

a program for inputting original image data;

a program for converting the original image data into a plurality of image planes based on a feature and for reducing the number of colors in the original image data to a reduced number;

a program for editing the converted image planes; and a program for automatically revising other image planes based on a preceding edit.

17. The storage medium according to claim 16, further comprising:

a program for deleting pixel information within a designated area of the image plane.

18. The storage medium according to claim 17, further comprising:

a program for automatically restoring the pixel information on the designated area of the image plane corresponding to the preceding deletion on the other image plane.

19. The storage medium according to claim 16, further comprising:

a program for supplementing pixel information into a designated area of the image plane.

20. The storage medium according to claim 19, further comprising:

a program for automatically deducting the pixel information corresponding to the preceding addition from all the other image planes.

21. The storage medium according to claim 16, further comprising:

a program for forming a composite image from all the image planes; and a program for displaying the composite image.

22. The storage medium according to claim 16, further comprising:

a program for forming a single image plane from the plurality of image planes.

23. A storage medium for storing programs for embroidery data generation for creating embroidery data, which is essential to control the embroidery workings of a embroidery machine, comprising:

the storage medium of claim 6;

a program for creating embroidery data based on image data of each image plane by adopting the image plane as one embroidery area; and a program for determining a thread-color based on the color of the image plane, and accompanying thread color data with the embroidery data.

* * * * *